(12) United States Patent
Varkey et al.

(10) Patent No.: US 10,049,789 B2
(45) Date of Patent: Aug. 14, 2018

(54) COMPRESSION AND STRETCH RESISTANT COMPONENTS AND CABLES FOR OILFIELD APPLICATIONS

(71) Applicant: Schlumberger Technology Corporation, Sugar Land, TX (US)

(72) Inventors: Joseph Varkey, Sugar Land, TX (US); David Kim, Stafford, TX (US); Maria Grisanti, Missouri City, TX (US); Burcu Unal Altintas, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/177,616

(22) Filed: Jun. 9, 2016

(65) Prior Publication Data
US 2017/0358385 A1 Dec. 14, 2017

(51) Int. Cl.
| | |
|---|---|
| *G02B 6/44* | (2006.01) |
| *H01B 9/00* | (2006.01) |
| *H01B 7/02* | (2006.01) |
| *H01B 13/14* | (2006.01) |
| *H01B 13/00* | (2006.01) |
| *G02B 6/50* | (2006.01) |

(52) U.S. Cl.
CPC .......... *H01B 9/005* (2013.01); *G02B 6/4416* (2013.01); *G02B 6/4483* (2013.01); *G02B 6/4486* (2013.01); *G02B 6/504* (2013.01); *H01B 7/0225* (2013.01); *H01B 7/0275* (2013.01); *H01B 13/0036* (2013.01); *H01B 13/14* (2013.01)

(58) Field of Classification Search
CPC ...... G02B 6/4416; G02B 6/44; G02B 6/3817; G02B 6/4494; G02B 6/443; H01B 11/22
See application file for complete search history.

(56) References Cited

U.S. PATENT DOCUMENTS

| | | | |
|---|---|---|---|
| 6,496,627 B1 * | 12/2002 | Tuminaro | C03C 25/607 385/102 |
| 2008/0289851 A1 * | 11/2008 | Varkey | G02B 6/4416 174/115 |
| 2013/0084044 A1 * | 4/2013 | Ertel | G02B 6/428 385/88 |

* cited by examiner

*Primary Examiner* — Jennifer Doan
(74) *Attorney, Agent, or Firm* — Sara K.M. Hinkley

(57) ABSTRACT

An opto-electrical cable may include an opto-electrical cable core and a polymer layer surrounding the opto-electrical cable core. The opto-electrical cable core may include a wire, one or more channels extending longitudinally along the wire, and one or more optical fibers extending within each channel. The opto-electrical cable may be made by a method that includes providing a wire having a channel, providing optical fibers within the channel to form an opto-electrical cable core, and applying a polymer layer around the opto-electrical cable core. A multi-component cable may include one or more electrical conductor cables and one or more opto-electrical cables arranged in a coax, triad, quad configuration, or hepta configuration. Deformable polymer may surround the opto-electrical cables and electrical conductor cables.

8 Claims, 31 Drawing Sheets

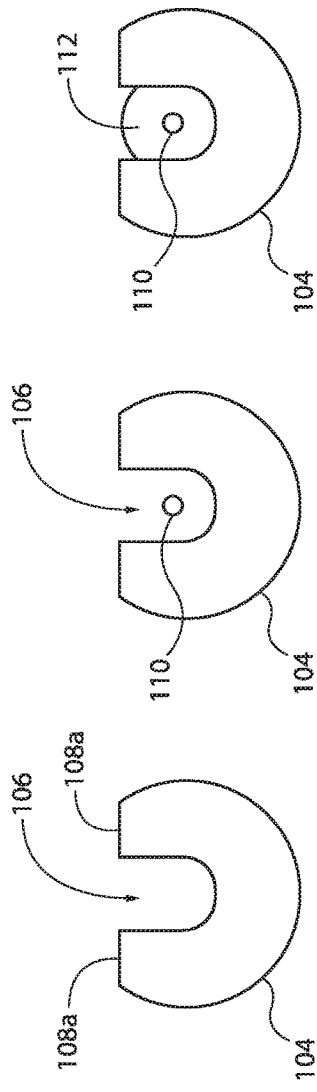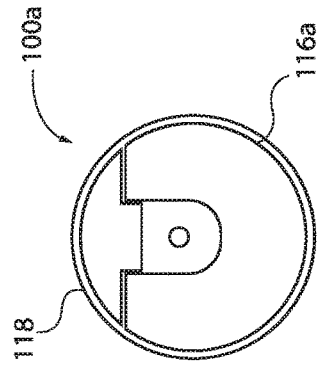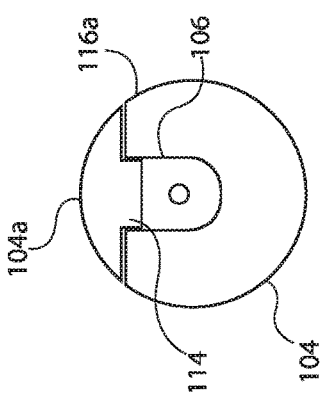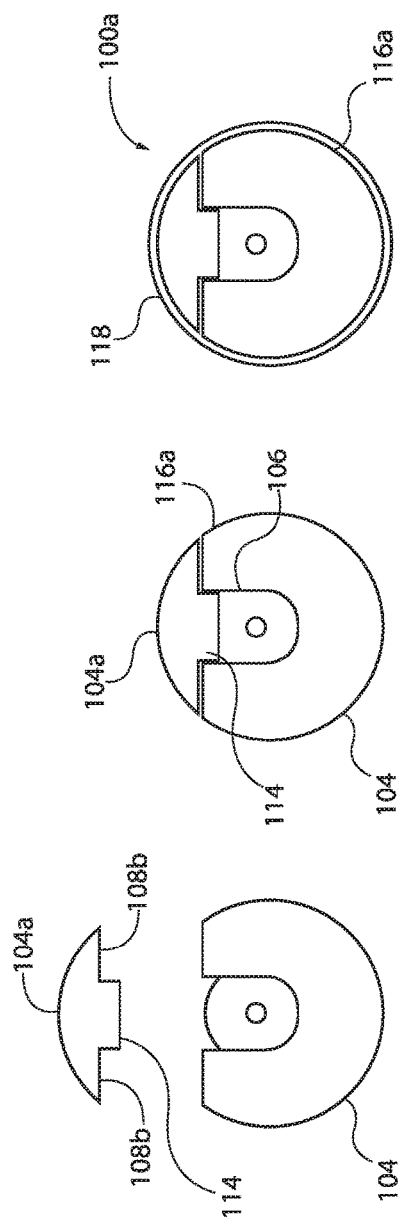

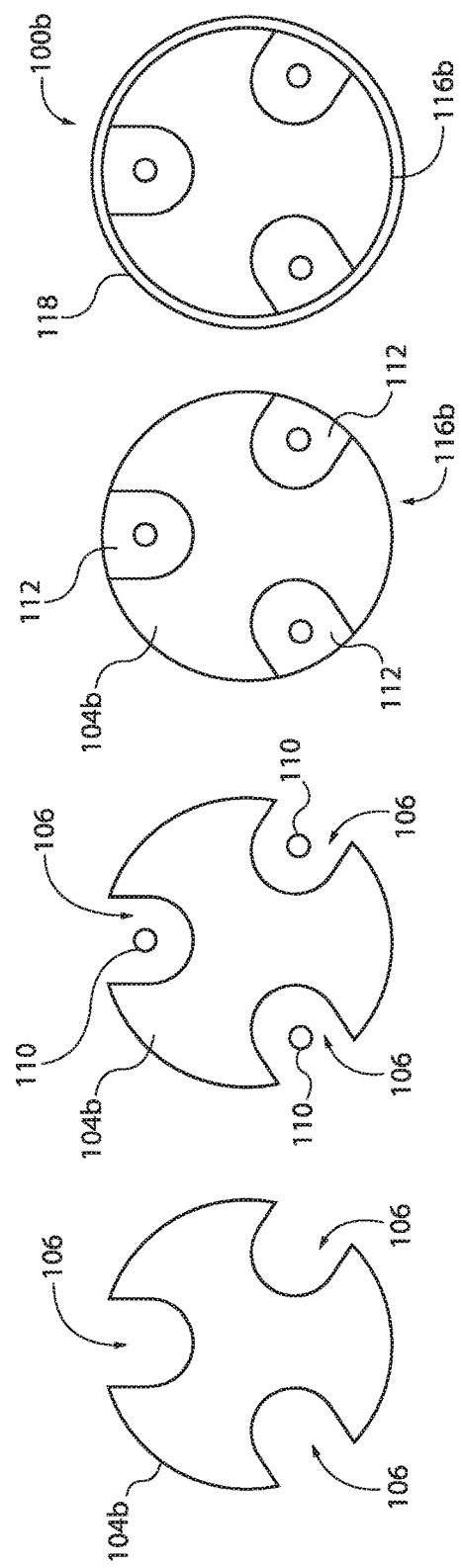

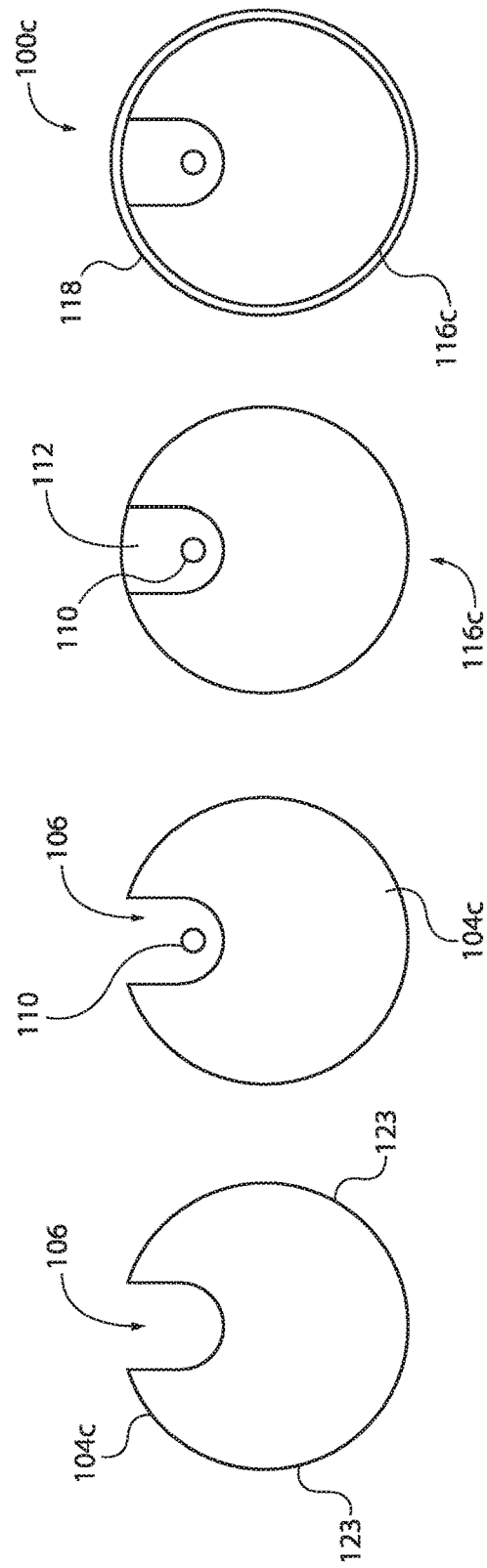

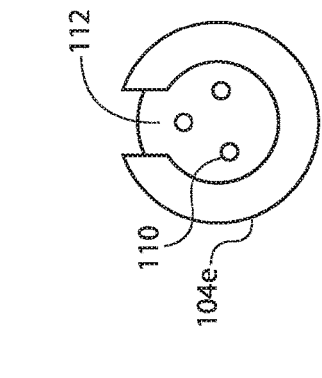
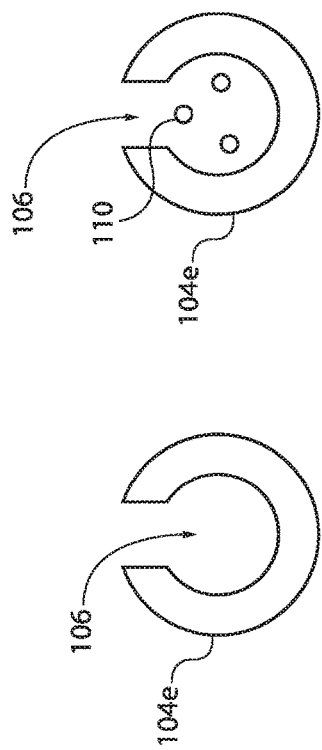
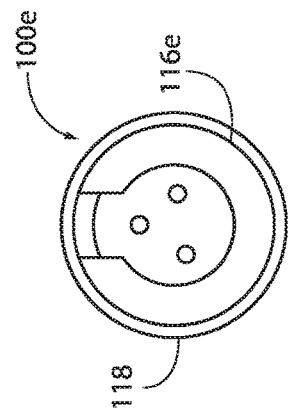
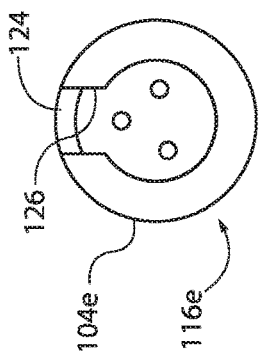
FIG. 5A  FIG. 5B  FIG. 5C  FIG. 5D  FIG. 5E

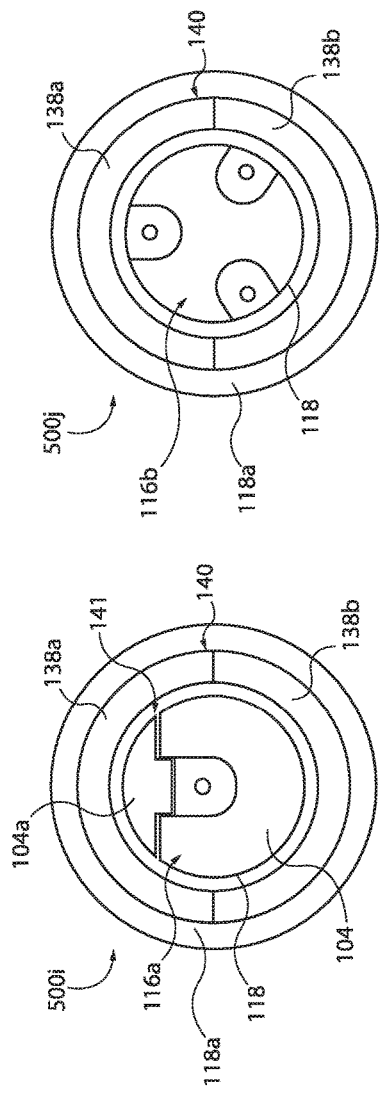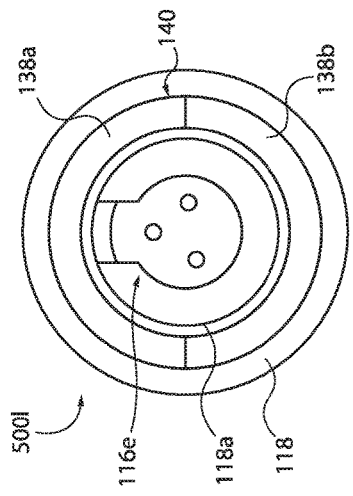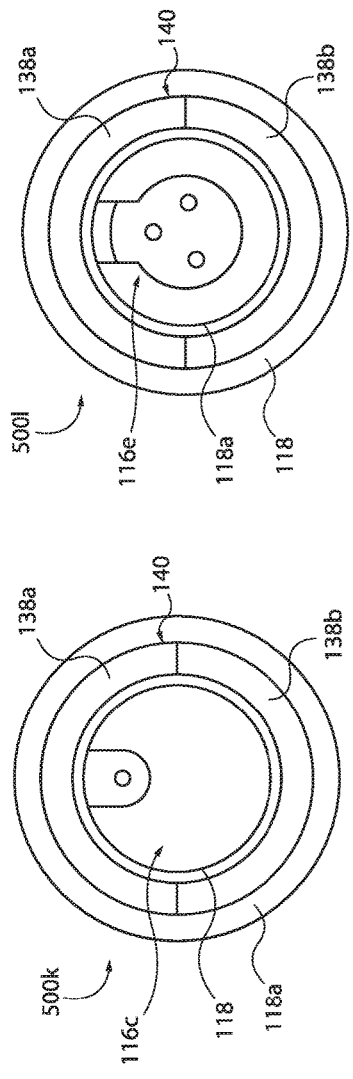
FIG. 8A
FIG. 8B
FIG. 8C
FIG. 8D

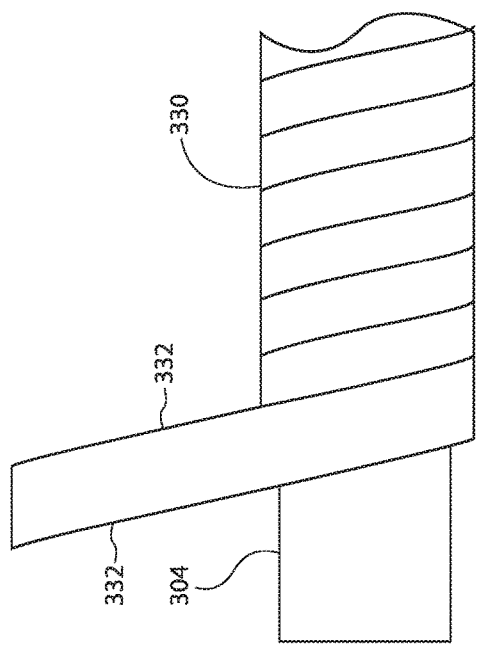

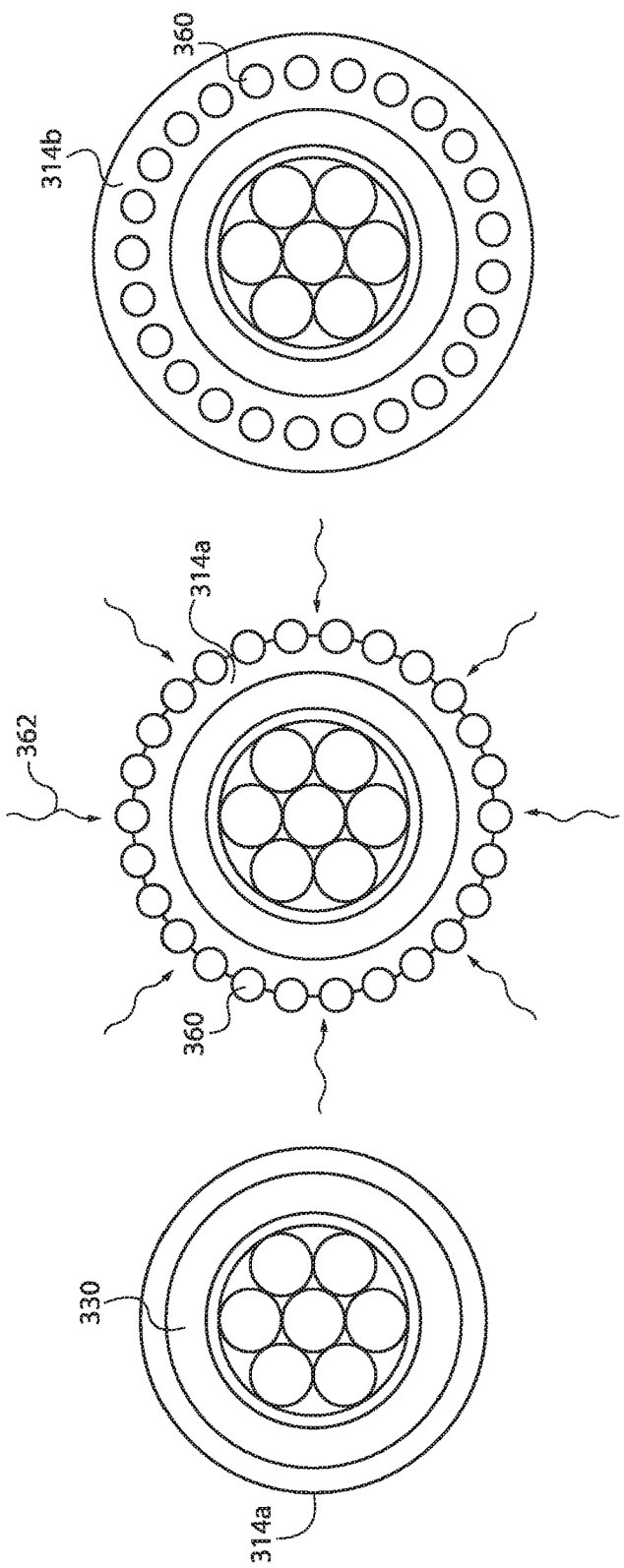

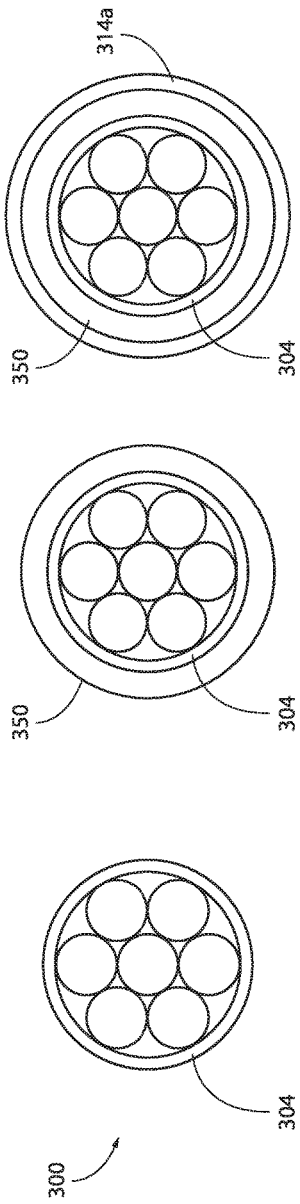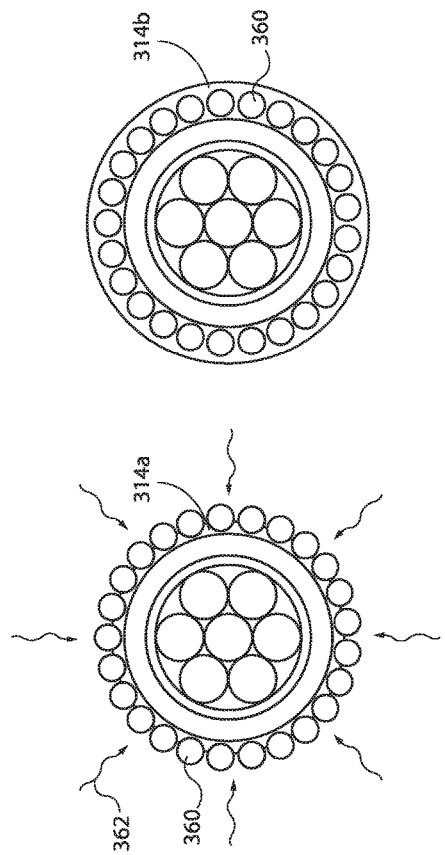

COMPRESSION AND STRETCH RESISTANT COMPONENTS AND CABLES FOR OILFIELD APPLICATIONS

CROSS-REFERENCE TO RELATED APPLICATIONS

Not applicable.

FIELD

Embodiments of the present disclosure generally relate to cables for providing electrical power and telemetry to downhole tools.

BACKGROUND

Certain opto-electrical cables for providing both electrical power and telemetry to downhole tools include a tube formed of semicircular-profile wires that surround optical fibers. Traditionally, such opto-electrical cables, when subjected to longitudinal strain and/or compressive forces, are subject to "milking," where filler gel and/or optical fibers within the tube are squeezed out of the tube. Manufacturing imperfections may increase the occurrence of milking.

SUMMARY

The present disclosure provides for an opto-electrical cable. The opto-electrical cable includes an opto-electrical cable core, and a polymer layer longitudinally and circumferentially surrounding the opto-electrical cable core. The opto-electrical cable core includes a wire, at least one channel formed within the wire and extending longitudinally along the wire, and optical fibers extending longitudinally within each channel.

The present disclosure provides for a multi-component cable. The multi-component cable includes electrical conductor cables and opto-electrical cables. Deformable polymer longitudinally and circumferentially surrounds the opto-electrical cables and the electrical conductor cables. The opto-electrical cables and the electrical conductor cables are arranged within the deformable polymer in a coax configuration, a triad configuration, a quad configuration, or a hepta configuration. Each opto-electrical cable includes an opto-electrical cable core. Each opto-electrical cable core includes a wire, at least one channel formed within the wire and extending longitudinally along the wire, and optical fibers extending longitudinally within each channel. A polymer layer longitudinally and circumferentially surrounds each opto-electrical cable core.

The present disclosure provides for a method. The method includes providing a wire having at least one channel extending longitudinally within and along the wire. The method includes providing optical fibers extending longitudinally within each channel. The wire and the optical fibers form an opto-electrical cable core. The method includes applying a polymer layer longitudinally and circumferentially surrounding the opto-electrical cable core to form an opto-electrical cable.

BRIEF DESCRIPTION OF DRAWINGS

The present disclosure may be understood from the following detailed description when read with the accompanying figures. It is emphasized that, in accordance with the standard practice in the industry, various features may not be drawn to scale. In fact, the dimensions of the various features may be arbitrarily increased or reduced for clarity of discussion.

FIGS. 1A-1F depicts cross-sectional views showing manufacture of the opto-electrical cable of FIG. 1 in accordance with certain embodiments of the present disclosure.

FIGS. 2A-2D depicts cross-sectional views showing manufacture of the opto-electrical cable of FIG. 2 in accordance with certain embodiments of the present disclosure.

FIGS. 3A-3D depicts cross-sectional views showing manufacture of the opto-electrical cable of FIG. 3 in accordance with certain embodiments of the present disclosure.

FIGS. 5A-5E depicts cross-sectional views showing manufacture of the opto-electrical cable of FIG. 5 in accordance with certain embodiments of the present disclosure.

FIGS. 8A-8D depicts cross-sectional views of additional embodiments of opto-electrical cables having completion layers in accordance with certain embodiments of the present disclosure.

FIGS. 10A-10D depicts cross-sectional views of additional embodiments of opto-electrical cables having completion layers in accordance with certain embodiments of the present disclosure.

FIGS. 18A-18H depicts cross-sectional views showing manufacture of jacketed multi-component cables having a layer of metallic cladding tape in accordance with certain embodiments of the present disclosure.

FIGS. 20A-20G depicts cross-sectional views showing manufacture of jacketed multi-component cables having a layer of hard polymer in accordance with certain embodiments of the present disclosure.

DETAILED DESCRIPTION

Figure 1:
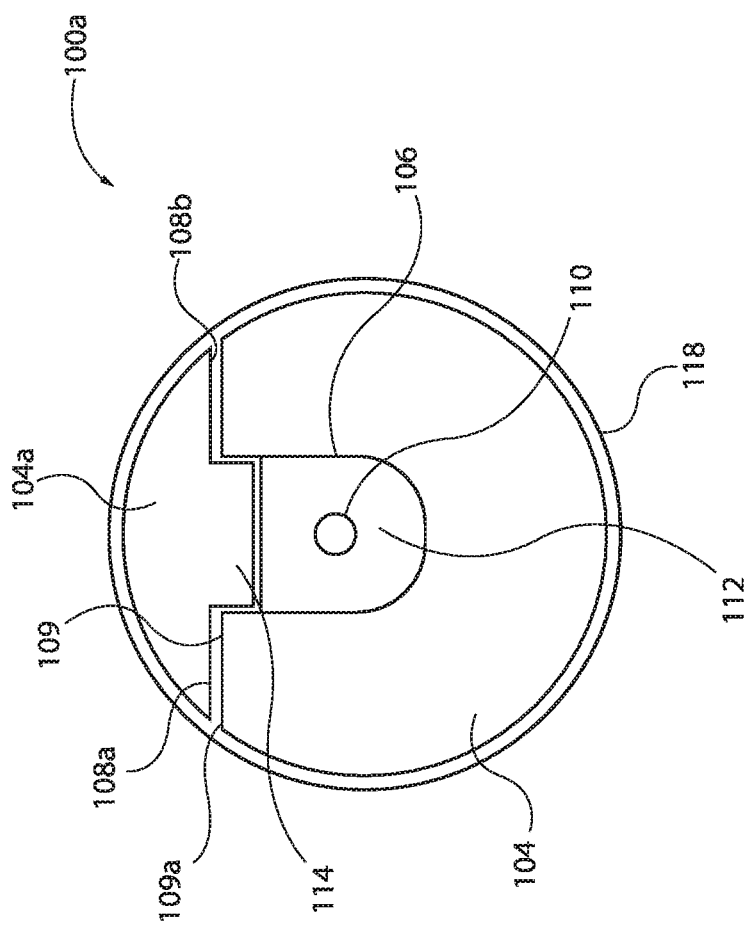
FIG. 1 depicts a cross-sectional view of an opto-electrical cable including a wire having a channel and cap configuration in accordance with certain embodiments of the present disclosure.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology. In addition, the present disclosure may repeat reference numerals and/or letters in the various examples. This repetition is for the purpose of simplicity and clarity and does not in itself dictate a relationship between the various embodiments and/or configurations discussed.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Embodiments of the present disclosure may include an opto-electrical cable for providing electrical power, data transmission, distributed sensing capabilities, or combinations thereof. For example and without limitation, the opto-electrical cable may be used to provide electrical power, data transmission, distributed sensing capabilities, or combinations thereof to downhole tools within a wellbore. In certain embodiments, the opto-electrical cable may include stable, durable, stretch-resistant and compression-resistant opto-electrical cable cores adapted to resist milking.

FIG. 1 depicts an embodiment of opto-electrical cable 100a. Opto-electrical cable 100a may include base wire 104. Base wire 104 may include channel 106 formed within and extending along a longitudinal axis of base wire 104. In certain embodiments, base wire 104 has a partial-circular-profile. Base wire 104 may be a conductive metal wire. For example and without limitation, base wire 104 may be a copper wire, a copper alloy wire, a steel wire, or an aluminum wire. In certain embodiments, base wire 104 has base wire mating face 108a. Base wire mating face 108a may extend from channel edge 109 to outer wire circumference 109a of base wire 104. Channel 106 may be formed within base wire 104 between two portions of base wire mating face 108a. In some embodiments, base wire mating face 108a is a planar surface. One or more optical fibers 110 may extend longitudinally within channel 106. In certain embodiments, optical fibers 110 may be composed of acrylate fibers, polyimide fibers, or silicone perfluoroalkoxy (PFA) fibers. In certain embodiments, filler 112 may encase optical fibers 110 within channel 106. Filler 112 may provide protective cushioning to optical fibers 110. In some embodiments, filler 112 is a soft gel filler, such as a silicon polymer gel. Opto-electrical cable 100a may include cap wire 104a. Cap wire 104a may be formed of the same or different conductive materials as base wire 104. In some embodiments, cap wire 104a has a semicircular outer profile. Cap wire 104a may be mechanically coupled with base wire 104. For example and without limitation, cap wire 104a may include cap wire mating face 108b and tab 114 extending from cap wire mating face 108b. In some embodiments, tab 114 extends from cap wire mating face 108b between two portions cap wire mating face 108b. Tab 114 may be sized and shaped to fit within channel 106 in base wire 104. Tab 114 may extend at least partially into channel 106 and longitudinally along cap wire 104a. With optical fibers 110 and filler 112 within channel 106, tab 114 of cap wire 104a may be mechanically coupled into channel 106 of base wire 104. For example and without limitation, tab 114 may be close fit, location fit, or interference fit within channel 106. In some embodiments, tab 114 may be press fit or shrink fit into channel 106. When cap wire 104a is mechanically coupled with base wire 104, cap wire mating face 108b may be in contact with base wire mating face 108a. In some embodiments, cap wire mating face 108b is a planar surface. Cap wire 104a may enclose and/or seal channel 106. Opto-electrical cable 100a may include one or more polymer layers 118 encasing base wire 104 and cap wire 104a. In some embodiments, polymer layer 118 includes one or more layers of tape. For example and without limitation, the tape of polymer layer 118 may be a polyetheretherketone (PEEK) tape. In some embodiments, polymer layer 118 includes one or more layers of extruded polymer. Polymer layer 118 may retain optical fibers 110 and filler 112 in position within channel 106. In certain embodiments, opto-electrical cable 100a has a circular-profile. In operation, when opto-electrical cable 100a is subjected to compressive forces and/or longitudinal strain, cap wire 104a may be remain mechanically coupled with base wire 104. For example, tab 114 may remain mechanically coupled within channel 106, preventing or reducing the occurrence of milking.

FIGS. 1A-1F depict manufacture of opto-electrical cable 100a in accordance with this disclosure. Base wire 104 having base wire mating face 108a and channel 106 may be provided, as shown in FIG. 1A. One or more optical fibers 110 may be placed within channel 106, as shown in FIG. 1B.

Filler 112 may be placed into channel 106, encasing optical fibers 110, as shown in FIG. 1C. Cap wire 104a having tab 114 and cap wire mating face 108b may be provided, as shown in FIG. 1D. Cap wire 104a may be mechanically coupled with base wire 104 by engaging tab 114 into channel 106 and engaging base wire mating face 108a with cap wire mating face 108b, enclosing channel 106 and forming opto-electrical cable core 116a, as shown in FIG. 1E. One or more polymer layers 118 may by wrapped around or extruded over opto-electrical cable core 116a, encasing opto-electrical cable core 116a and forming opto-electrical cable 100a, as shown in FIG. 1F. Polymer layer 118 may longitudinally and circumferentially surround opto-electrical cable core 116a.

Figure 2:
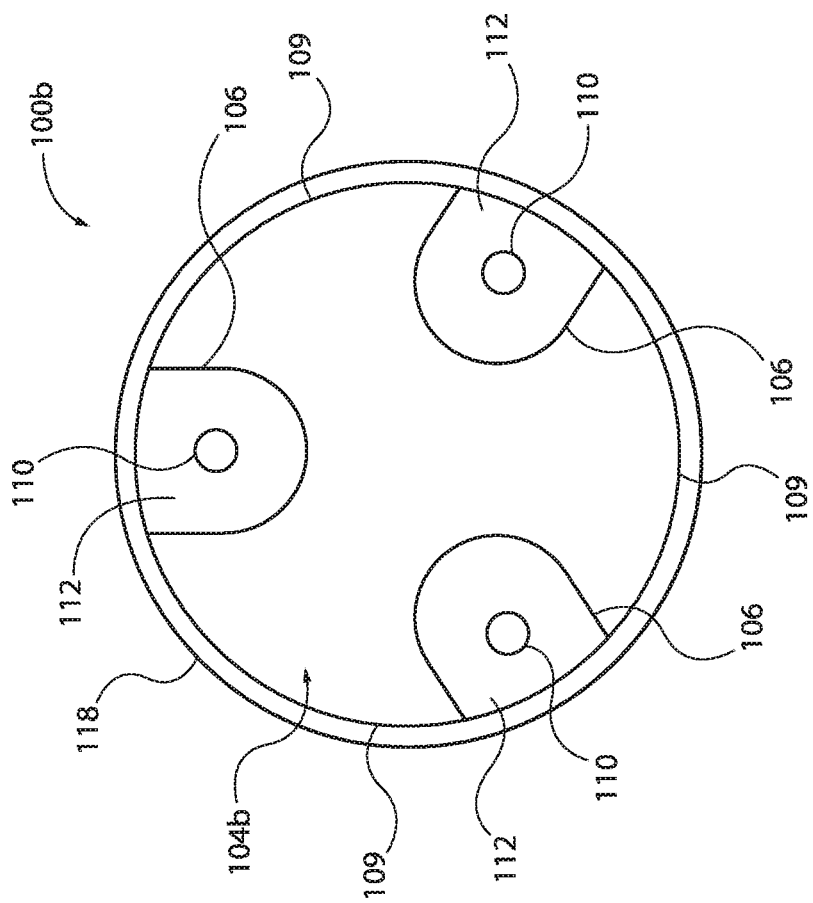
FIG. 2 depicts a cross-sectional view an opto-electrical cable including a wire having multiple channels in accordance with certain embodiments of the present disclosure.

FIG. 2 depicts another embodiment of an opto-electrical cable consistent with this disclosure. Opto-electrical cable 100b may include wire 104b. In certain embodiments, wire 104b has a circular-profile. Wire 104b may be composed of the same or different materials as base wire 104. Wire 104b may have one or more channels 106, two or more channels 106, or three or more channels 106 formed within and extending along a longitudinal axis of wire 104b. For example and without limitation, wire 104b is depicted in FIG. 2 as having three channels 106. Channels 106 may be formed within wire 104b between two portions of outer wire circumference 109 of wire 104b. In embodiments of wire 104b having multiple channels 106, channels 106 may be uniformly spaced about outer wire circumference 109. In other embodiments of wire 104b having multiple channels 106, channels 106 are non-uniformly spaced about outer wire circumference 109. In some embodiments, channels 106 may extend parallel with a longitudinal axis of wire 104b along the length of wire 104b. In other embodiments, channels 106 may spiral helically about the longitudinal axis of wire 104b. One or more optical fibers 110 may extend longitudinally within each channel 106 of wire 104b. Optical fibers 110 may be composed of the same materials or different materials as discussed with respect to FIG. 1. In certain embodiments, filler 112 may be encase optical fibers 110 within channels 106. Filler 112 may be the same as or different than filler 112 described with respect to FIG. 1. In certain embodiments, filler 112 encases the entirety of wire 104b (not shown). In other embodiments, filler 112 does not encase the entirety of wire 104b. Opto-electrical cable 100b may include one or more polymer layers 118 encasing wire 104b and channels 106. Polymer layer 118 may be the same as or different than polymer layer 118 as described with respect to FIG. 1. Polymer layer 118 may surround channel 106 and/or filler 112 within channel 106. In certain embodiments, opto-electrical cable 100b has a circular-profile.

FIGS. 2A-2D depict manufacture of opto-electrical cable 100b in accordance with this disclosure. Wire 104b having one or more channels 106 may be provided, as shown in FIG. 2A. One or more optical fibers 110 may be placed within each channel 106 of wire 104b, as shown in FIG. 2B. Filler 112 may be placed within each channel 106, encasing optical fibers 110 and forming opto-electrical cable core 116b, as shown in FIG. 2C. One or more polymer layers 118 may be wrapped around or extruded over opto-electrical cable core 116b, forming opto-electrical cable 100b, as shown in FIG. 2D. Polymer layer 118 may longitudinally and circumferentially surround opto-electrical cable core 116b.

Figure 3:
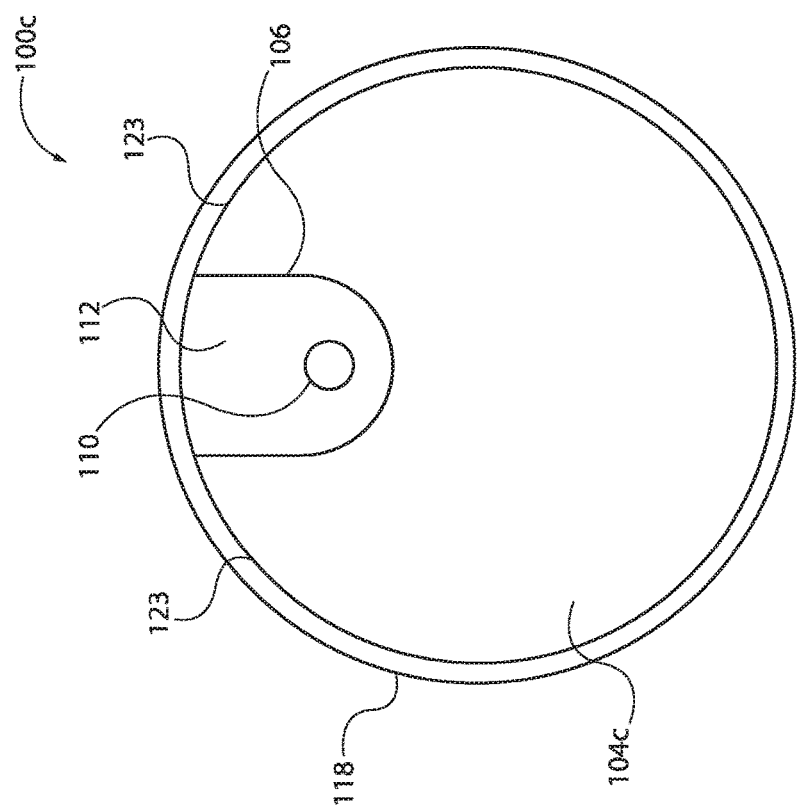
FIG. 3 depicts a cross-sectional view an opto-electrical cable including a wire having a single channel in accordance with certain embodiments of the present disclosure.

FIG. 3 depicts another embodiment of an opto-electrical cable in accordance with this disclosure. Opto-electrical cable 100c may include wire 104c. In certain embodiments, wire 104c has a circular-profile with circular or arcuate outer wire circumference 123. Wire 104c may be composed of the same or different materials as base wire 104. Wire 104c may have a single channel 106. Channel 106 may be formed within wire 104c between two portions of outer wire circumference 123. Channel 106 may extend along a longitudinal axis of wire 104c. In some embodiments, channel 106 may extend parallel with the longitudinal axis of wire 104c along the length of wire 104c. In other embodiments, channel 106 may spiral helically about longitudinal axis of wire 104c. One or more optical fibers 110 may extend longitudinally within channel 106 of wire 104c. Optical fibers 110 may be composed of the same materials or different materials as discussed with respect to FIG. 1. In certain embodiments, filler 112 may encase optical fibers 110 within channel 106. Filler 112 may be the same as or different than filler 112 described with respect to FIG. 1. In certain embodiments, filler 112 encases the entirety of wire 104c (not shown). In other embodiments, filler 112 does not encase the entirety of wire 104c. Opto-electrical cable 100c may include one or more polymer layers 118 encasing wire 104c and channel 106. Polymer layer 118 may be the same as or different than polymer layer 118 as described with respect to FIG. 1. Polymer layer 118 may surround channels 106 and/or filler 112 within channels 106. In certain embodiments, opto-electrical cable 100c has a circular-profile.

FIGS. 3A-3D depict manufacture of opto-electrical cable 100c in accordance with this disclosure. Wire 104c with outer wire circumference 123 and channel 106 may be provided, as shown in FIG. 3A. One or more optical fibers 110 may be placed within channel 106 of wire 104c, as shown in FIG. 3B. Filler 112 may be placed within channel 106, encasing optical fibers 110 and forming opto-electrical cable core 116c, as shown in FIG. 3C. One or more polymer layers 118 may be wrapped around or extruded over opto-electrical cable core 116c, forming opto-electrical cable 100c, as shown in FIG. 3D. Polymer layer 118 may longitudinally and circumferentially surround opto-electrical cable core 116c.

Figure 4:
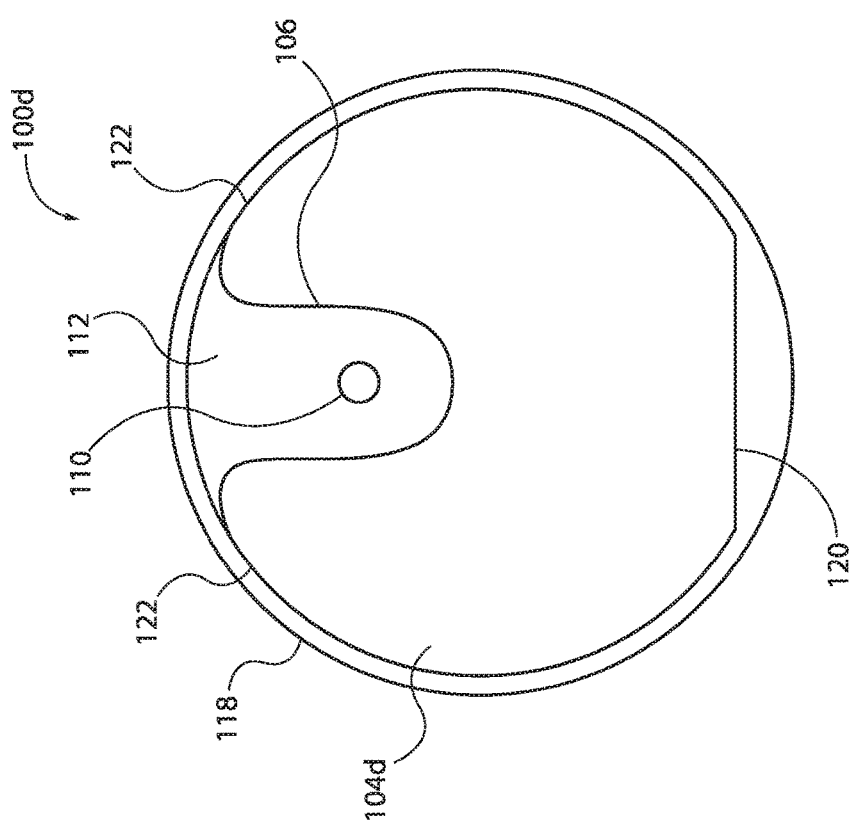
FIG. 4 depicts a cross-sectional view an opto-electrical cable including a wire having a single channel and a planar base in accordance with certain embodiments of the present disclosure.

FIG. 4 depicts another embodiment of an opto-electrical cable in accordance with this disclosure. Opto-electrical cable 100d may include wire 104d. In certain embodiments, wire 104d has a hexagonal-profile or an approximately hexagonal-profile. Wire 104d may be composed of the same or different materials as base wire 104. Wire 104d may have base 120 formed along a circumference of wire 104d. In some embodiments, base 120 is a planar surface formed on one side of wire 104d. Base 120 may extend along a longitudinal axis of wire 104d. Wire 104d may have a single channel 106. In some embodiments, wire 104d may have multiple channels (not shown). In certain embodiments, channel 106 of wire 104d may be formed within wire 104d between two portions of outer wire circumference 122 of wire 104d and opposite of base 120. Channel 106 may extend along a longitudinal axis of wire 104d. In some embodiments, channel 106 may extend parallel to the longitudinal axis of wire 104d along the length of wire 104d. In certain embodiments, channel 106 of wire 104d has a circular-profile or semi-circular-profile. In certain embodiments, opto-electrical cable 100d has a circular-profile. In certain embodiments, sides of outer wire circumference 122 have a non-circular profile, such that sides of wire 104d are at least partially flattened. One or more optical fibers 110 may extend longitudinally within channel 106 of wire 104d. Optical fibers 110 may be composed of the same materials or different materials as discussed with respect to FIG. 1. In certain embodiments, filler 112 may encase optical fibers 110 within channel 106. Filler 112 may be the same as or different than filler 112 described with respect to FIG. 1. In certain embodiments, filler 112 encases the entirety of wire 104d (not shown). In other embodiments, filler 112 does not encase the entirety of wire 104d. Opto-electrical cable 100d may include one or more polymer layers 118 encasing wire 104d and channel 106. Polymer layer 118 may be the same as or different than polymer layer 118 as described with respect to FIG. 1. Polymer layer 118 may surround channel 106 and/or filler 112 within channel 106.

Figures 4A, 4B, 4C, 4D:
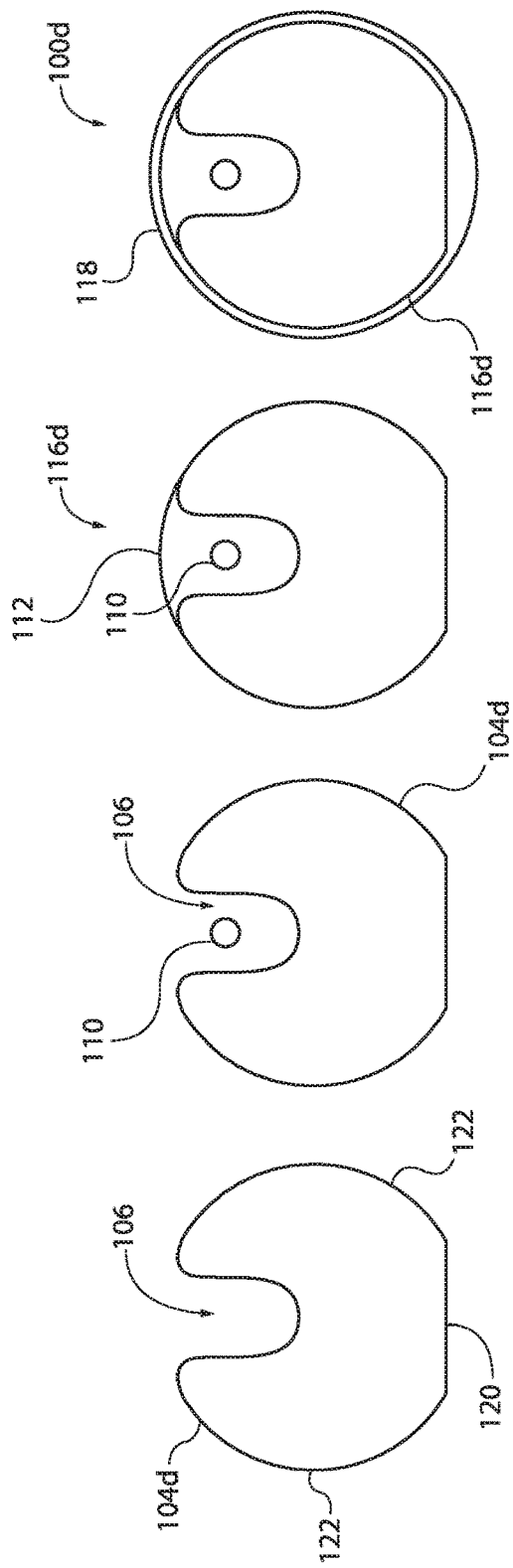
FIGS. 4A-4D depicts cross-sectional views showing manufacture of the opto-electrical cable of FIG. 4 in accordance with certain embodiments of the present disclosure.

FIGS. 4A-4D depict manufacture of opto-electrical cable 100d in accordance with this disclosure. Wire 104d having base 120, channel 106, and outer wire circumference 122 may be provided, as shown in FIG. 4A. Wire 104d may be held securely in place in a desired position and location and prevented from moving from the desired position and location. For example and without limitation, base 120 may be engaged on a surface (not shown) and sides of outer wire circumference 122 of wire 104d may be held to secure wire 104d in the desired position and location. With wire 104d secured in the desired position and location, one or more optical fibers 110 may be placed within channel 106 of wire 104d, as shown in FIG. 4B. Filler 112 may be placed within channel 106, encasing optical fibers 110 and forming opto-electrical cable core 116d, as shown in FIG. 4C. One or more polymer layers 118 may be wrapped around or extruded over opto-electrical cable core 116d, forming opto-electrical cable 100d, as shown in FIG. 4D. Polymer layer 118 may longitudinally and circumferentially surround opto-electrical cable core 116d.

Figure 5:
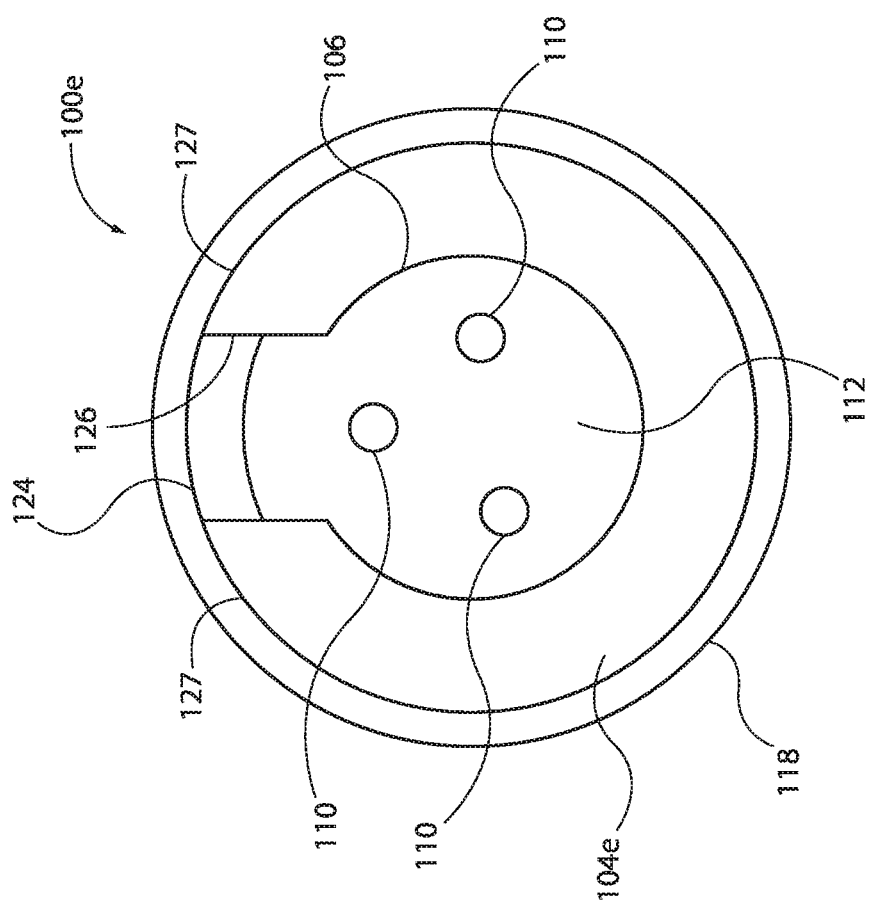
FIG. 5 depicts a cross-sectional view an opto-electrical cable including a wire having a single channel and a C-shaped profile in accordance with certain embodiments of the present disclosure.

FIG. 5 depicts another embodiment of an opto-electrical cable in accordance with this disclosure. Opto-electrical able 100e may include wire 104e. In certain embodiments, wire 104e has a C-shaped-profile. Wire 104e may be formed of the same or different materials as base wire 104. Wire 104e may have a single channel 106. Channel 106 may be formed within and extend along a longitudinal axis of wire 104e. In some embodiments, channel 106 may extend parallel with the longitudinal axis of wire 104e along the length of wire 104e. In certain embodiments, channel 106 is formed within a central interior of wire 104e, and channel 106 may concentrically aligned with the longitudinal axis of wire 104e. Channel 106 may have opening 126 formed between two portions of outer wire circumference 127. One or more optical fibers 110 may extend longitudinally within channel 106 of wire 104e. Optical fibers 110 may be composed of the same materials or different materials as discussed with respect to FIG. 1. Filler 112 may encase optical fibers 110 within channel 106. Filler 112 may be the same as or different than filler 112 described with respect to FIG. 1. Plug 124 may be mechanically coupled with and/or chemically bonded to wire 104e at opening 126 of channel 106. In certain embodiments, plug 124 may be a hard polymer plug. For example and without limitation, plug 124 may be composed of a polymer or gel having a higher viscosity than filler 112. Plug 124 may enclose and/or seal filler 112 and/or optical fibers 110 within channel 106. In some embodiments, a layer of material forming plug 124 is located circumferentially about wire 104e (not shown). Opto-electrical cable 100e may include one or more polymer layers 118 encasing wire 104e and plug 124. Polymer layer 118 may be the same as or different than polymer layer 118 as described with respect to FIG. 1. Polymer layer 118 may surround opening 126 of channel 106 and/or filler 112 within channel 106. In certain embodiments, opto-electrical cable 100e has a circular-profile.

FIG. 5A-5E depict manufacture of opto-electrical cable 100e in accordance with this disclosure. Wire 104e having channel 106 may be provided, as shown in FIG. 5A. One or more optical fibers 110 may be placed within channel 106 of wire 104e, as shown in FIG. 5B. Filler 112 may be placed within channel 106, encasing optical fibers 110, as shown in FIG. 5C. Plug 124 may be mechanically coupled with and/or chemically bonded to wire 104e at opening 126 of channel 106, forming opto-electrical cable core 116e, as shown in FIG. 5D. For example and without limitation, plug 124 may be mechanically coupled with and/or chemically bonded to wire 104e prior to filler 112 (e.g., silicon polymer gel) curing within channel 106. In operation, when plug 124 is mechanically coupled with and/or chemically bonded to wire 104e, plug 124 may restrict movement of optical fibers 110 during and/or after curing of filler 112 within channel 106, preventing or reducing the occurrence of milking. In certain embodiments, a quantity of material forming plug 124 is applied in a layer circumferentially about wire 104e (not shown). One or more polymer layers 118 may be wrapped around or extruded over opto-electrical cable core 116e, forming opto-electrical cable 100e, as shown in FIG. 5E. Polymer layer 118 may longitudinally and circumferentially surround opto-electrical cable core 116e.

In certain embodiments, the opto-electrical cable core includes a single wire, as is depicted in FIGS. 2-5E. In other embodiments, the opto-electrical cable core includes at least two wires, as is depicted in FIGS. 1-1F. In operation, optical fibers 110 may be used to transmit data, and wires (e.g., 104, 104a-104e) may be used to transmit electrical power and/or data. For example and without limitation, wires (e.g., 104, 104a-104e) may provide electrical power downhole to a toolstring, and coiled tubing or casing may be used to complete the circuit. Optical fibers 110 may be used for telemetry and/or as sensors to measure distributed temperature, pressure, and longitudinal stain, for example.

In some embodiments, polymer layer 118 may provide insulation to optical fibers 110 and wires (e.g., 104, 104a-104e). In certain embodiments, micro-bundles of optical fibers 110 may be contained within channels 106 of wires (e.g., 104, 104a-104e), increasing the number of optical fibers 110 within channels 106 of wires (e.g., 104, 104a-104e). Bundled optical fibers 110 may include single mode and/or multi-mode optical fibers. In some embodiments, optical fibers 110 are cabled in a helix, which may increase the longitudinal strain optical fibers 110 can sustain. In some embodiments, optical fibers 110 are uncoated optical fibers. In other embodiments, optical fibers 110 are coated optical fibers.

Figure 6A:
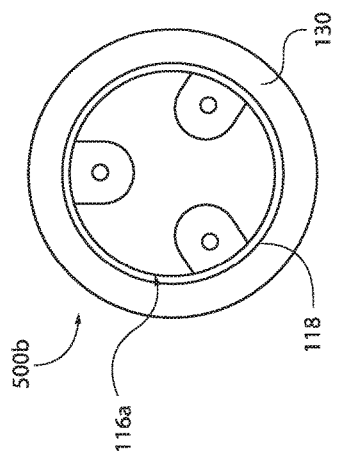
FIGS. 6A-6D depicts cross-sectional views of opto-electrical cables having completion layers in accordance with certain embodiments of the present disclosure.
Figure 6B:
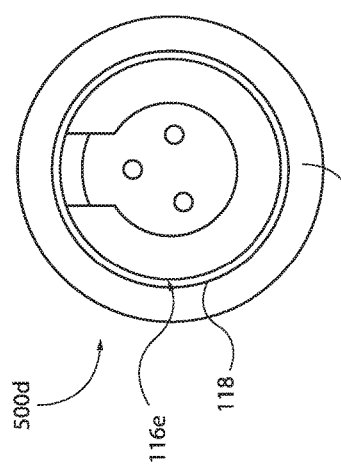
Figure 6C:
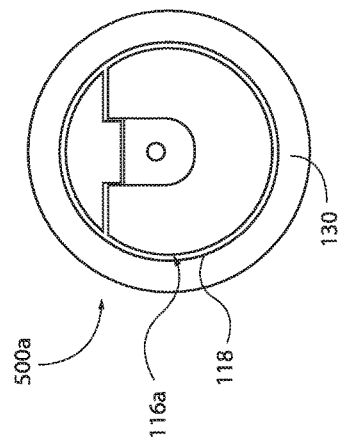
Figure 6D:
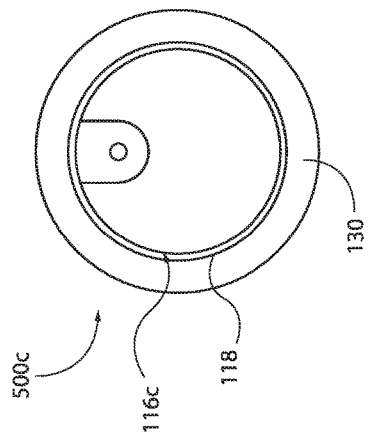

Each of opto-electrical cables 100a-100e may include one or more completion layers, forming a completed opto-electrical cable. FIGS. 6A, 6B, 6C and 6D depict embodiments of completed opto-electrical cables in accordance with this disclosure. As shown in FIG. 6A, completed opto-electrical cables 500a may include opto-electrical cable core 116a longitudinally and circumferentially surrounded by one or more polymer layers 118. As shown in FIG. 6B, completed opto-electrical cables 500b may include opto-electrical cable core 116b longitudinally and circumferentially surrounded by one or more polymer layers 118. As shown in FIG. 6C, completed opto-electrical cables 500c may include opto-electrical cable core 116c longitudinally and circumferentially surrounded by one or more polymer layers 118. As shown in FIG. 6D, completed opto-electrical cables 500d may include opto-electrical cable core 116e longitudinally and circumferentially surrounded by one or more polymer layers 118. Completed opto-electrical cables 500a-500d may each include layer of cladding 130 longitudinally and circumferentially surrounding polymer layers 118, as shown in FIGS. 6A-6D, respectively. For example and without limitation, cladding 130 may be composed of a metal, such as Zn, Ni, Mo or Fe. While completed opto-electrical cables 500a-500d are shown as having opto-electrical cables 100a, 100b, 100c and 100e, one skilled in the art with the aid of the present disclosure would understand that cladding 130 may also be applied to opto-electrical cables 100d to form a completed opto-electrical cable.

Figure 7A:
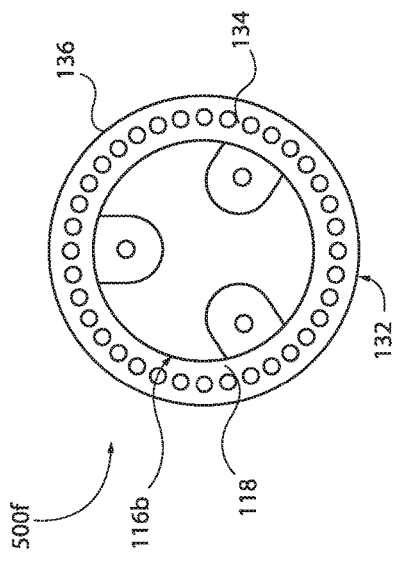
FIGS. 7A-7D depicts cross-sectional views of additional embodiments of opto-electrical cables having completion layers in accordance with certain embodiments of the present disclosure.
Figure 7B:
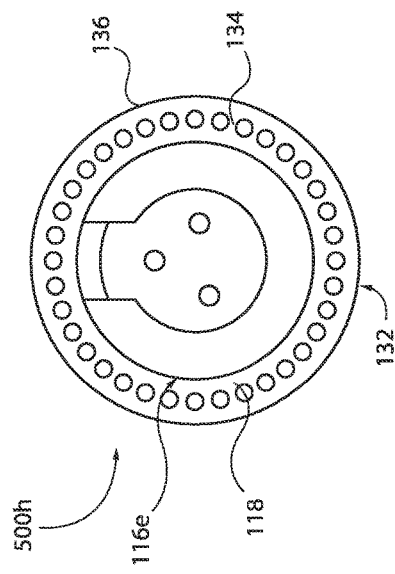
Figure 7C:
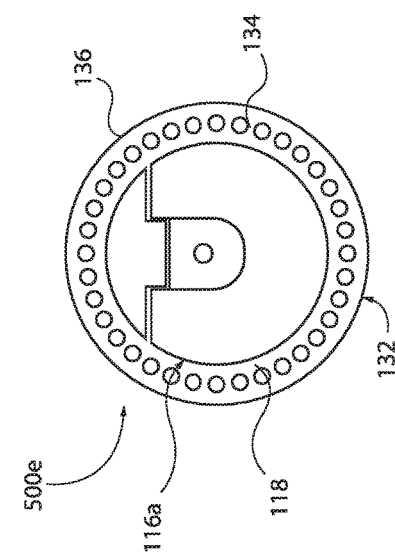
Figure 7D:
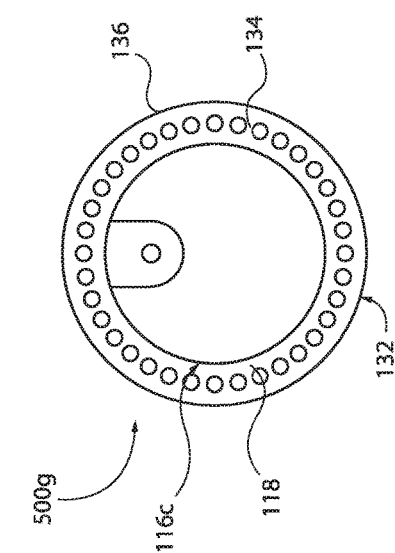

FIGS. 7A, 7B, 7C and 7D depict additional embodiments of completed opto-electrical cables in accordance with this disclosure. Completed opto-electrical cable 500e may include opto-electrical cable core 116a longitudinally and circumferentially surrounded by one or more polymer layers 118, as shown in FIG. 7A. Completed opto-electrical cable 500f may include opto-electrical cable core 116b longitudinally and circumferentially surrounded by one or more polymer layers 118, as shown in FIG. 7B. Completed opto-electrical cable 500g may include opto-electrical cable core 116c longitudinally and circumferentially surrounded by one or more polymer layers 118, as shown in FIG. 7C. Completed opto-electrical cable 500h may include opto-electrical cable core 116e longitudinally and circumferentially surrounded by one or more polymer layers 118, as shown in FIG. 7D. With references to FIGS. 7A-7D, each of completed opto-electrical cables 500e-500h may include jacket layer 132 longitudinally and circumferentially surrounding polymer layers 118. Each jacket layer 132 may include wires 134 encased within polymer 136. Wires 134 may be small served wires. Polymer 136 may be composed of the same composition as polymer layers 118, or may be composed of a different composition. For example and without limitation, jacket layer 132 may be at least partially composed of TEFZEL® or carbon-fiber-reinforced TEFZEL®. While completed opto-electrical cables 500e-500h are shown as having opto-electrical cables 100a, 100b, 100c and 100e, one skilled in the art with the aid of the present disclosure would understand that jacket layer 132 may also be applied to opto-electrical cables 100d to form a completed opto-electrical cable.

FIGS. 8A, 8B, 8C and 8D depict additional embodiments of completed opto-electrical cables in accordance with this disclosure. Completed opto-electrical cable 500i may include opto-electrical cable core 116a longitudinally and circumferentially surrounded by one or more polymer layers 118, as shown in FIG. 8A. Completed opto-electrical cable 500j may include opto-electrical cable core 116b longitudinally and circumferentially surrounded by one or more polymer layers 118, as shown in FIG. 8B. Completed opto-electrical cable 500k may include opto-electrical cable core 116c longitudinally and circumferentially surrounded by one or more polymer layers 118, as shown in FIG. 8C. Completed opto-electrical cable 500l may include opto-electrical cable core 116e longitudinally and circumferentially surrounded by one or more polymer layers 118, as shown in FIG. 8D. With reference to FIGS. 8A-8D, each completed opto-electrical cable 500i-500l may include two arcuate metal wires 138a and 138b, forming a tube longitudinally and circumferentially surrounding polymer layers 118. Arcuate metal wires 138a and 138b may be composed of the same or different conductive metal as base wire 104. Each completed opto-electrical cable 500i-500l may include second polymer layer 118a longitudinally and circumferentially surrounding and encasing arcuate metal wires 138a and 138b. Second polymer layer 118a may be composed of the same or different composition as polymer layers 118. In operation, wire (e.g., 104, 104a-104e) may prevent the tube formed by arcuate metal wires 138a and 138b from flattening under compressive forces. Seam 140 between arcuate metal wires 138a and 138b may be aligned with a solid portion of wire (e.g., 104, 104a-104e). For example and without limitation, seam 140 may be aligned with a portion of wire (e.g., 104, 104a-104e) that does not have a channel located on a circumference of wire (e.g., 104, 104a-104e), or seam 140 may be aligned with a portion of wire (e.g., 104, 104a-104e) that does not have a wire seam, such as wire seam 141 between base wire 104 and cap wire 104a. Without being bound by theory, with seam 140 aligned with a solid portion of wire (e.g., 104, 104a-104e), shifting of wire (e.g., 104, 104a-104e) may be prevented or reduced, preventing or reducing the occurrence of milking. In operation, arcuate metal wires 138a and 138b may transmit data, electricity, or combinations thereof. While completed opto-electrical cables 500i-500l are shown as having opto-electrical cables 100a, 100b, 100c and 100e, one skilled in the art with the aid of the present disclosure would understand that arcuate metal wires 138 and second polymer layer 118a may also be applied to opto-electrical cables 100d to form a completed opto-electrical cable.

Figure 9A:
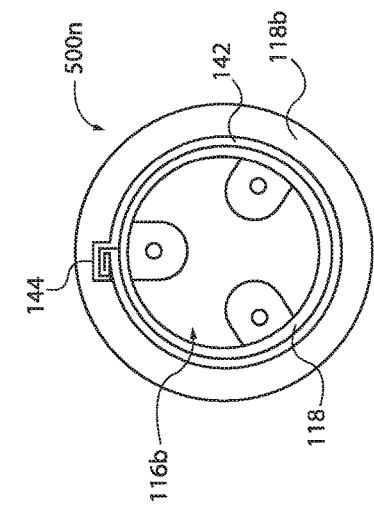
FIGS. 9A-9D depicts cross-sectional views of additional embodiments of opto-electrical cables having completion layers in accordance with certain embodiments of the present disclosure.
Figure 9B:
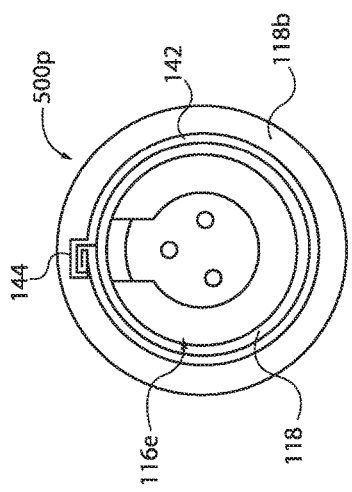
Figure 9C:
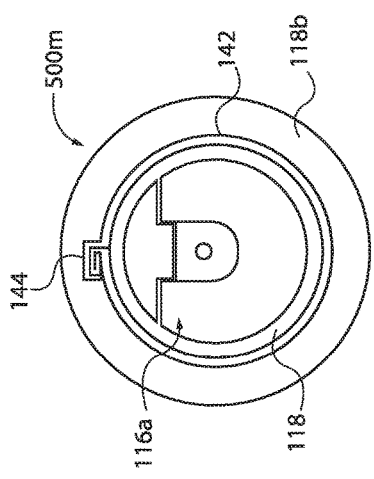
Figure 9D:
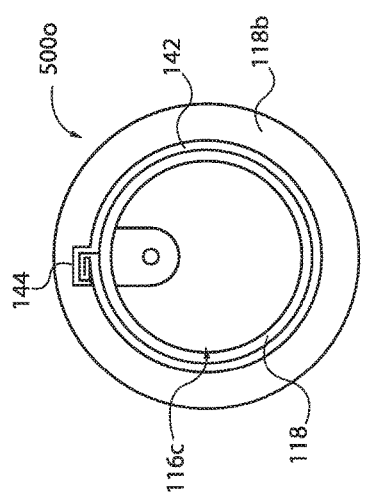
Figure 101B:
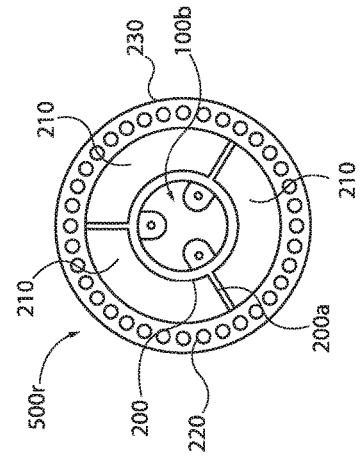

FIGS. 9A, 9B, 9C and 9D depict additional embodiments of completed opto-electrical cables in accordance with this disclosure. Completed opto-electrical cable 500m may include opto-electrical cable core 116a longitudinally and circumferentially surrounded by one or more polymer layers 118, as shown in FIG. 9A. Completed opto-electrical cable 500n may include opto-electrical cable core 116b longitudinally and circumferentially surrounded by one or more polymer layers 118, as shown in FIG. 9B. Completed opto-electrical cable 500o may include opto-electrical cable core 116c longitudinally and circumferentially surrounded by one or more polymer layers 118, as shown in FIG. 9C. Completed opto-electrical cable 500p may include opto-electrical cable core 116e longitudinally and circumferentially surrounded by one or more polymer layers 118, as shown in FIG. 9D. With references to FIGS. 9A-9D, each completed opto-electrical cable 500m-500p may include metallic tape 142 longitudinally and circumferentially surrounding polymer layers 118. Metallic tape 142 may have longitudinally crimped seam 144, where two ends of metallic tape 142 are crimped together after wrapping metallic tape 142 about polymer layers 118. Each completed opto-electrical cables 500m-500p may include additional layer of polymer 118b longitudinally and circumferentially surrounding metallic tape 142. Additional layer of polymer 118b may be composed of the same or different composition as polymer layers 118. While completed opto-electrical cables 500m-500p are shown as having opto-electrical cables 100a, 100b, 100c and 100e, one skilled in the art with the aid of the present disclosure would understand that metallic tape 142 and additional layer of polymer 118b may also be applied to opto-electrical cables 100d to form a completed opto-electrical cable.

Figure 10D:
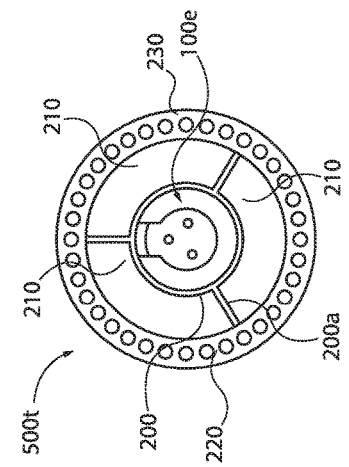
Figure 10A:
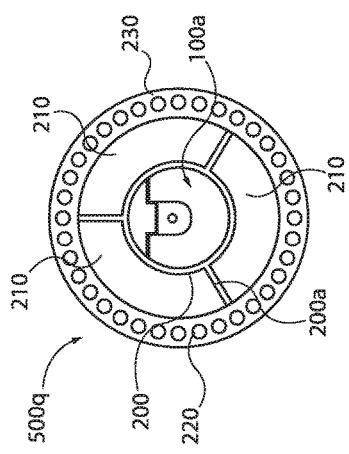
Figure 10C:
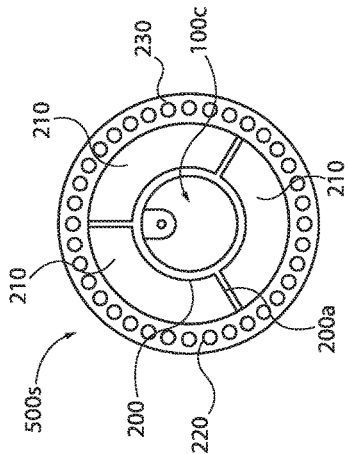

FIGS. 10A-10D depict additional embodiments of completed opto-electrical cables in accordance with this disclosure. Completed opto-electrical cable 500q may include opto-electrical cable 100a, as shown in FIG. 10A. Completed opto-electrical cable 500r may include opto-electrical cable 100b, as shown in FIG. 10B. Completed opto-electrical cable 500s may include opto-electrical cable 100c, as shown in FIG. 10C. Completed opto-electrical cable 500t may include opto-electrical cable 100e, as shown in FIG. 10D. With reference to FIGS. 10A-10D, each of completed opto-electrical cables 500q-500t may include soft polymer layer 200 longitudinally and circumferentially surrounding opto-electrical cable 100a, 100b, 100c and 100e, respectively. For example and without limitation, soft polymer layer 200 may be a silicone polymer layer. Each of completed opto-electrical cables 500q-500t may include a plurality of arch-profile wires 210 longitudinally and circumferentially surrounding soft polymer layer 200. Arch-profile wires 210 may provide a solid surface over seams and/or channels 106 of opto-electrical cable 100a, 100b, 100c and 100e, respectively. For example and without limitation, arch-profile wires 210 may be composed of copper, copper-coated steel, or nickel coated copper. In certain embodiments, a portion of soft polymer layer 200a fills interstitial spaces between arch-profile wires 210. In some embodiments, a powder (not shown) may be located on soft polymer layer 200. Each of completed opto-electrical cables 500q-500t may include layer of stranded wires 220 encased within one or more additional layers of polymer 230 and surrounding arch-profile wires 210. Each of completed opto-electrical cables 500q-500t may have a coaxial cable configuration. Additional layers of polymer 230 may be composed of a material that is the same as or different than polymer layer 118. In operation, arch-profile wires 210 may transmit data, electricity, or combinations thereof.

Figure 11A:
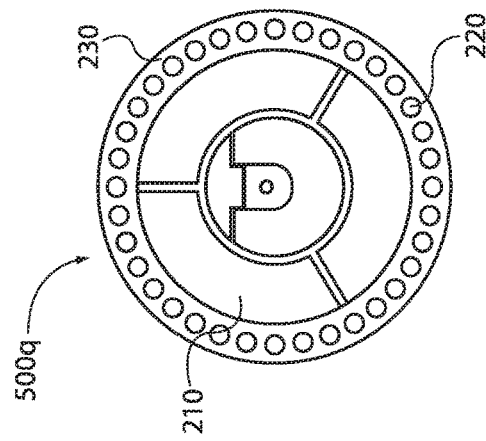
FIGS. 11A-11D depicts cross-sectional views showing manufacture of an opto-electrical cable having a completion layer in accordance with certain embodiments of the present disclosure.
Figure 11B:
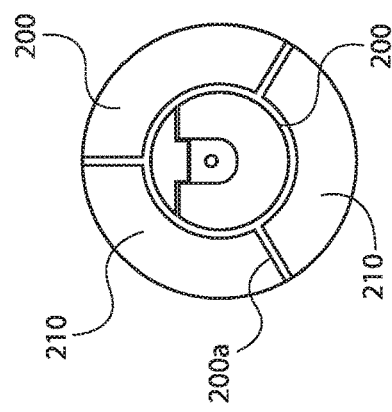
Figure 11C:
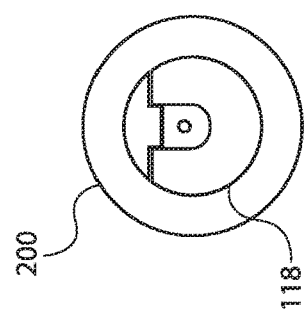
Figure 11D:
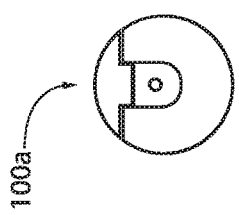

FIGS. 11A-11D depict manufacture of completed opto-electrical cable 500q in accordance with this disclosure. While manufacture of completed opto-electrical cable 500q is described with respect to opto-electrical cable 100a, one skilled in the art with the aid of the present disclosure would understand that the same manufacturing method of completed opto-electrical cable 500q may be performed with respect to opto-electrical cables 100b, 100c, 100d and 100e. Opto-electrical cable 100a may be provided, as shown in FIG. 11A. Soft polymer layer 200 may be extruded over opto-electrical cable 100a to longitudinally and circumferentially surround and encase polymer layers 118 of opto-electrical cable 100a, as shown in FIG. 11B. A plurality of arch-profile wires 210 may be applied to longitudinally and circumferentially surround soft polymer layer 200, as shown in FIG. 11C. In certain embodiments, when applying arch-profile wires 210 onto soft polymer layer 200, arch-profile wires 210 may compress over soft polymer layer 200, causing a portion of soft polymer layer 200a to fill the interstitial spaces between arch-profile wires 210. In some embodiments, a powder (not shown) may be applied on soft polymer layer 200. Without being bound by theory, it is believed that powder on soft polymer layer 200 may reduce or prevent metal of arch-profile wires 210 from sticking onto soft polymer layer 200. Layer of stranded wires 220 encased within one or more additional layers of polymer 230 may be applied to encase arch-profile wires 210, forming completed opto-electrical cable 500q.

Figure 12:
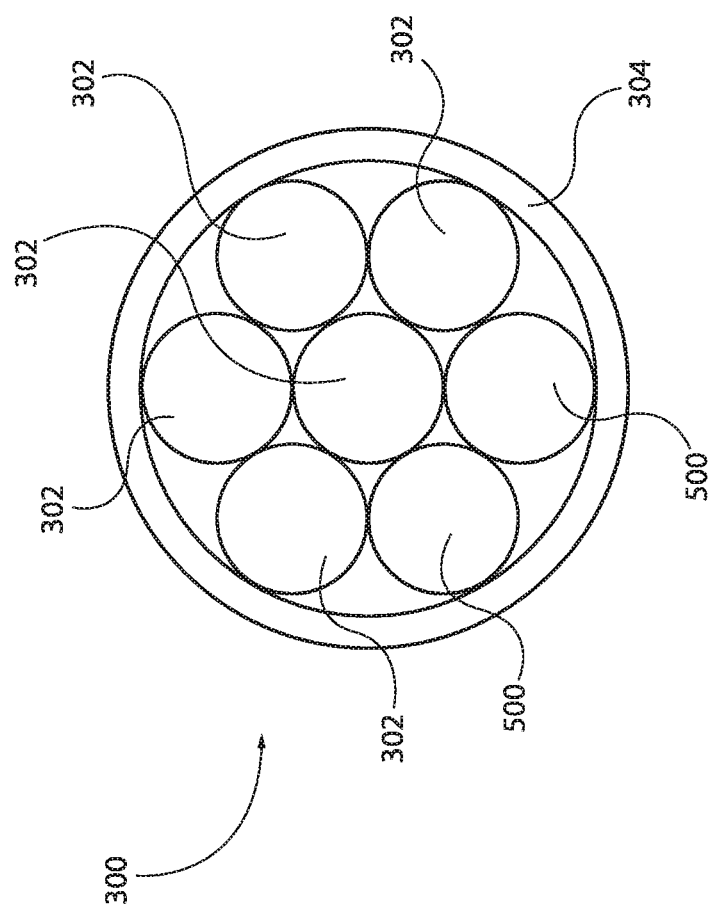
FIG. 12 depicts a cross-sectional view of a multi-component cable in accordance with certain embodiments of the present disclosure.

Embodiments of the present disclosure may include a multi-component cable. FIG. 12 depicts an embodiment of a multi-component cable in accordance with this disclosure. Multi-component cable 300 may include one or more completed opto-electrical cables 500 (e.g., 500a-500t) and one or more electrical conductor cables 302. Electrical conductor cables 302 may include one or more metallic conductor wires (not shown), which may be circumferentially and longitudinally surrounded by one or more insulation layers (not shown), such as one or more polymer layers. The metallic conductor wires of electrical conductor cables 302 may be composed of copper, copper-coated steel, or nickel coated copper, for example. In operation, electrical conductor cables 302 may provide electrical power to downhole tools within a wellbore. One or more layers of deformable polymer 304 may longitudinally and circumferentially surround completed opto-electrical cables 500 and electrical conductor cables 302. For example and without limitation, deformable polymer 304 may be extruded over completed opto-electrical cables 500 and electrical conductor cables 302, encasing completed opto-electrical cables 500 and electrical conductor cables 302. In certain embodiments, completed opto-electrical cables 500 and electrical conductor cables 302 are arranged within deformable polymer 304 in a coax configuration, a triad configuration, a quad configuration, or a hepta configuration. FIG. 12 depicts completed opto-electrical cables 500 and electrical conductor cables 302 arranged in a hepta configuration.

Figure 13A:
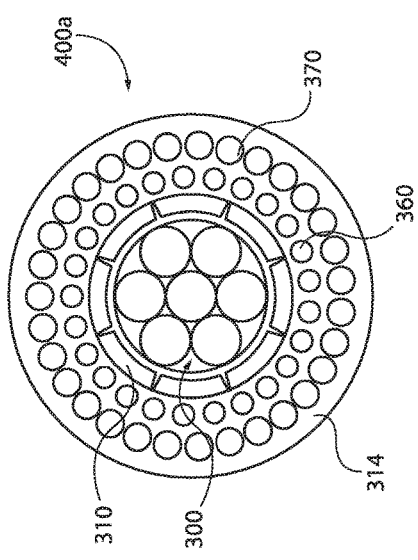
FIGS. 13A-13C depicts cross-sectional views of jacketed multi-component cables having arch-profile wires in accordance with certain embodiments of the present disclosure.
Figure 13C:
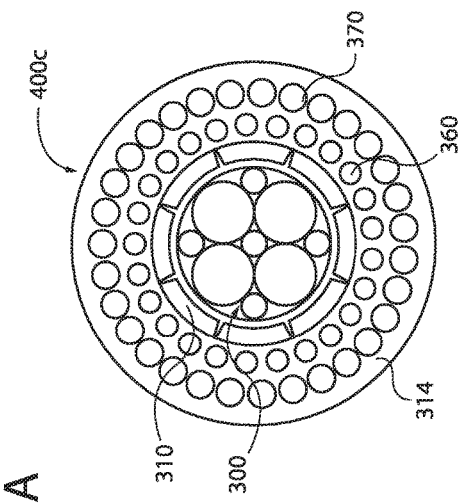
Figure 13B:
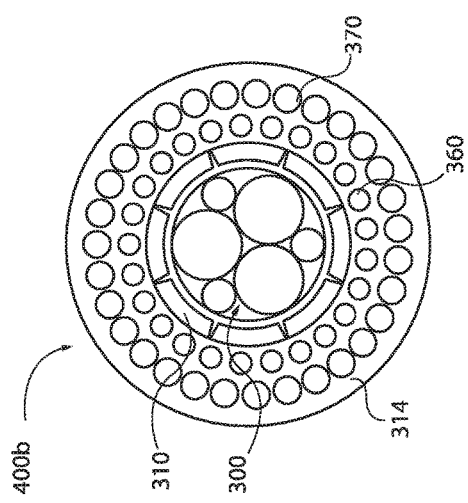

In certain embodiments multi-component cable 300 is a jacketed. FIGS. 13A-13C depict embodiments of a jacketed multi-component cable in accordance with this disclosure. FIG. 13A depicts jacketed multi-component cable 400a having a hepta configuration. FIG. 13B depicts jacketed multi-component cable 400b having a triad configuration. FIG. 13C depicts jacketed multi-component cable 400c having a quad configuration. Referring to FIGS. 13A-13C, each of jacketed multi-component cables 400a-400c may include a plurality of arch-profile wires 310 longitudinally and circumferentially surrounding multi-component cable 300. Each of jacketed multi-component cables 400a-400c may include one or more layers of reinforced polymer 314 longitudinally and circumferentially surrounding arch-profile wires 310. Reinforced polymer 314 may be composed of a carbon-fiber reinforced polymer. Reinforced polymer 314 may encase arch-profile wires 310 and retain arch-profile wires 310 in place about multi-component cable 300, such as during manufacturing and/or deployment (e.g., in a wellbore). In operation, under compressive forces during deployment of multi-component cable 300, arch-profile wires 310 may form a continuous arch circumferentially about multi-component cable 300, dispersing the compressive forces about the circumference of multi-component cable 300, preventing or reducing the occurrence of milking. Arch-profile wires 310 may be composed of copper, copper-coated steel, or nickel coated copper, for example and without limitation. Each of jacketed multi-component cables 400a-400c may include one or more layers of armor wires. For example each of jacketed multi-component cables 400a-400c may include inner layer of armor wires 360 and outer layer of armor wires 370. In certain embodiments, inner layer of armor wires 360 may be cabled helically over multi-component cable 300. In some embodiments, outer layer of armor wires 370 may be cabled counter-helically to inner layer of armor wires 360. In some embodiments, the armor wires of inner layer of armor wires 360 and outer layer of armor wires 370 may be composed of galvanized improved plow steel (GIPS) or alloy wires for improved corrosion resistance, such as a nickel-cobalt-chromium-molybdenum alloy (e.g., MP35N®), a molybdenum containing stainless steel alloy (e.g., INCOLOY® 27-7MO), or a nickel containing steel alloy (e.g., HC265).

Figure 14C:
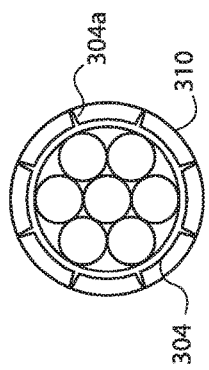
FIGS. 14A-14H depicts cross-sectional views showing manufacture of a jacketed multi-component cable having arch-profile wires in accordance with certain embodiments of the present disclosure.
Figure 14B:
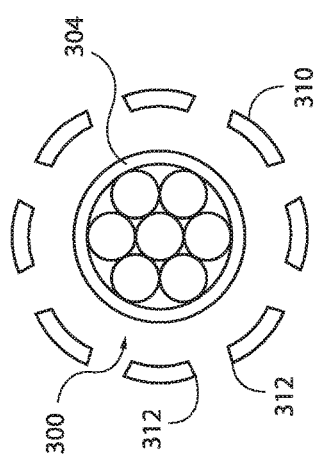
Figure 14A:
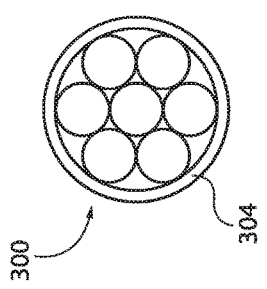
Figure 14F:
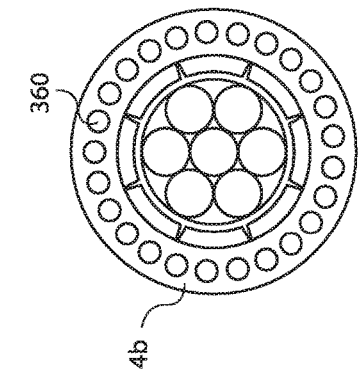
Figure 14E:
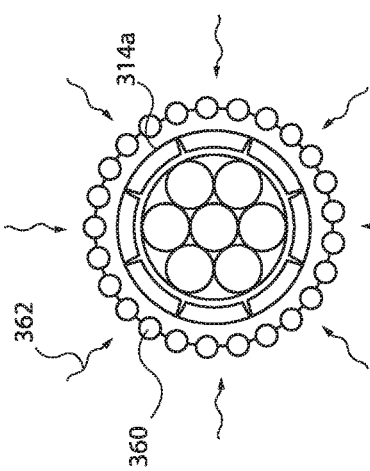
Figure 14D:
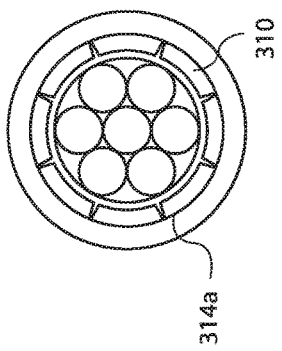
Figure 14H:
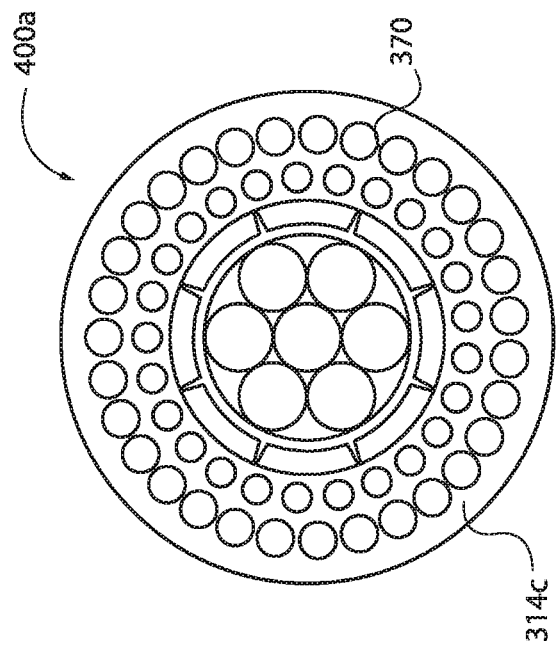
Figure 14G:
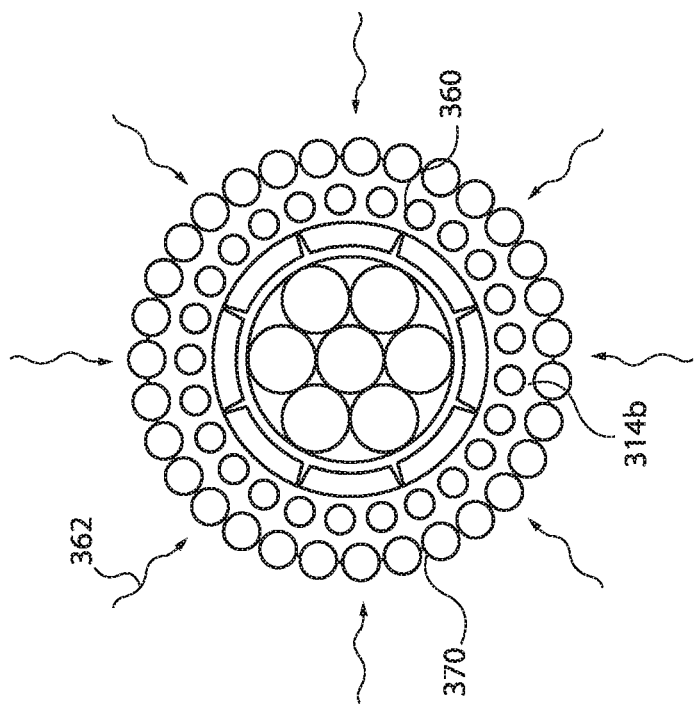

FIGS. 14A-14H depict manufacture of jacketed multi-component 400a in accordance with this disclosure. Multi-component cable 300 is provided, as shown in FIG. 14A, and arch-profile wires 310 are provided, as shown in FIG. 14B. Arch-profile wires 310 are at least partially embedded into deformable polymer 304, as shown in FIG. 14C. In some embodiments, a portion of deformable polymer 304a fills interstitial spaces between arch-profile wires 310. After being applied over deformable polymer 304, edges 312 of arch-profile wires 310 are in contact with one another, forming a compression-resistant barrier over multi-component cable 300. First layer of reinforced polymer 314a may longitudinally and circumferentially surround arch-profile wires 310, as shown in FIG. 14D. For example and without limitation, first layer of reinforced polymer 314a may be extruded over arch-profile wires 310, encasing arch-profile wires 310. Inner layer of armor wires 360 may longitudinally and circumferentially surround reinforced polymer 314a, as shown in FIG. 14E. In certain embodiments, inner layer of armor wires 360 may be at least partially embedded into reinforced polymer 314a. For example and without limitation, inner layer of armor wires 360 may be applied to reinforced polymer 314a while reinforced polymer 314a is in a pliable state, such as after extrusion of reinforced polymer 314a or after passing multi-component cable 300 with reinforced polymer 314a through an infrared 362 heating source. Second layer of reinforced polymer 314b may surround inner layer of armor wires 360, as shown in FIG. 14F. For example and without limitation, second layer of reinforced polymer 314b may be extruded over inner layer of armor wires 360, encasing inner layer of armor wires 360. Reinforced polymer 314b may bond with reinforced polymer 314a through the interstitial spaces between the wires of inner layer of armor wires 360. Reinforced polymer 314b may longitudinally and circumferentially surround inner layer of armor wires 360. Outer layer of armor wires 370 may be partially embedded into reinforced polymer 314b, as shown in FIG. 14G. Outer layer of armor wires 370 may longitudinally and circumferentially surround reinforced polymer 314b. For example and without limitation, while reinforced polymer 314b is in a pliable state, outer layer of armor wires 370 may be partially embedded into reinforced polymer 314b. Reinforced polymer 314b may be in a pliable state after extrusion of second layer of reinforced polymer 314b or after passing multi-component cable 300 with reinforced polymer 314b through infrared 362 heating source, for example. Third layer of reinforced polymer 314c may longitudinally and circumferentially surround outer layer of armor wires 370, as shown in FIG. 14H. Reinforced polymer 314c may bond with reinforced polymer 314b through interstitial spaces between the armor wires of outer layer of armor wires 370, encasing outer layer of armor wires 370.

Figure 15A:
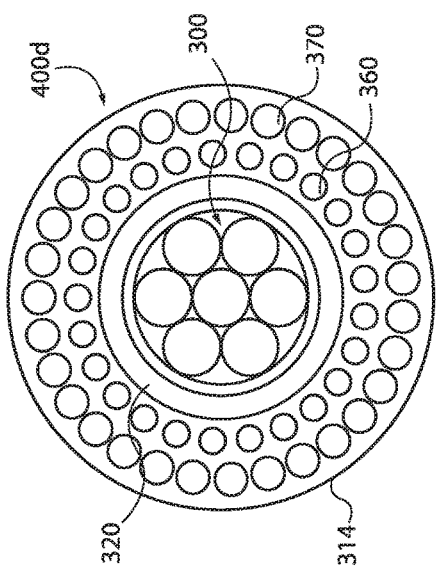
FIGS. 15A-15C depicts cross-sectional views of jacketed multi-component cables having a layer of corrugated metallic tape in accordance with certain embodiments of the present disclosure.
Figure 15C:
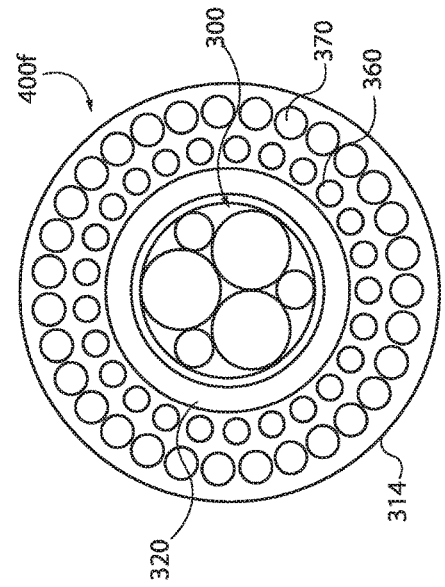
Figure 15B:
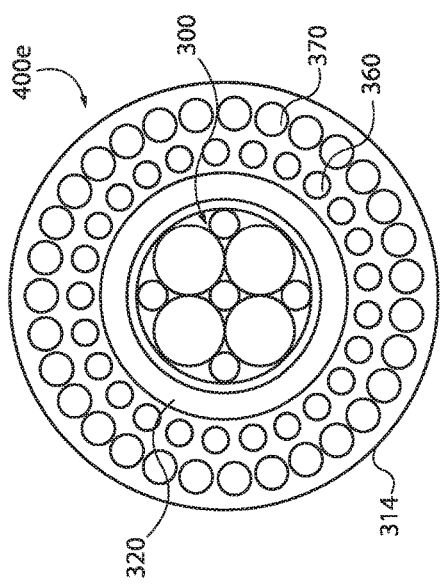

FIGS. 15A-15C depict additional embodiments of jacketed multi-component cables in accordance with this disclosure. FIG. 15A depicts jacketed multi-component cable 400d having a hepta configuration. FIG. 15B depicts jacketed multi-component cable 400e having a quad configuration. FIG. 15C depicts jacketed multi-component cable 400f having a triad configuration. With reference to FIGS. 15A-15C, each of jacketed multi-component cables 400d-400f include one or more layers of corrugated metallic tape 320 longitudinally and circumferentially surrounding multi-component cable 300. Corrugated metallic tape 320 may be compression resistant, and may be adapted to bend over radii, such as spools and sheaves. Each of jacketed multi-component cables 400d-400f may include one or more layers of reinforced polymer 314 longitudinally and circumferentially surrounding layer of corrugated metallic tape 320. Reinforced polymer 314 may encase layer of corrugated metallic tape 320 and retain layer of corrugated metallic tape 320 in place about multi-component cable 300, such as during manufacturing and/or deployment (e.g., in a wellbore). In operation, deformable polymer 304 (not shown) may cushion multi-component cable 300 against compressive forces, and reinforced polymer 314 may cushion multi-component cable 300 against compressive forces and form a circular-profile. In certain embodiments, layer of corrugated metallic tape 320 protects multi-component cable 300 against compressive forces and enhances flexibility of multi-component cable 300, preventing or reducing the occurrence of milking. Each of jacketed multi-component cables 400d-400f may include one or more layers of armor wires. For example, each of jacketed multi-component cables 400d-400f may include inner layer of armor wires 360 and outer layer of armor wires 370. In certain embodiments, inner layer of armor wires 360 may be cabled helically over multi-component cable 300. In some embodiments, outer layer of armor wires 370 may be cabled counter-helically to inner layer of armor wires 360.

Figure 16A:
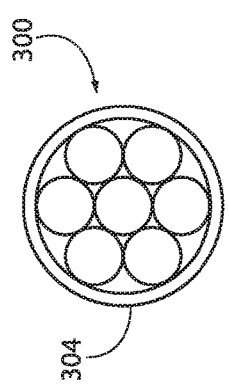
FIGS. 16A-16I depicts cross-sectional views showing manufacture of jacketed multi-component cables having a layer of corrugated metallic tape in accordance with certain embodiments of the present disclosure.
Figure 16B:
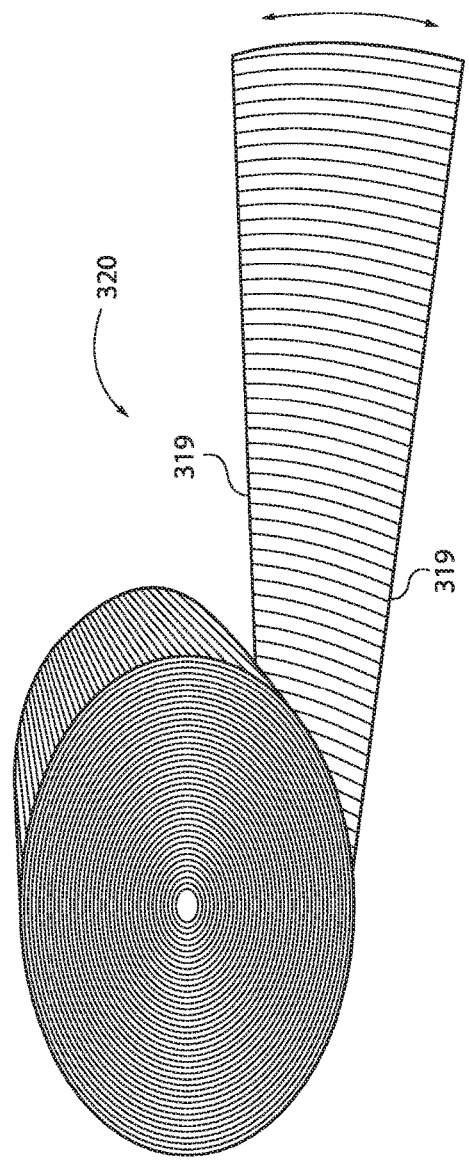
Figure 16C:
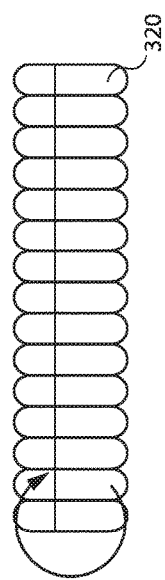
Figure 16D:
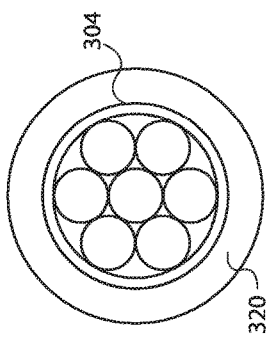
Figure 16G:
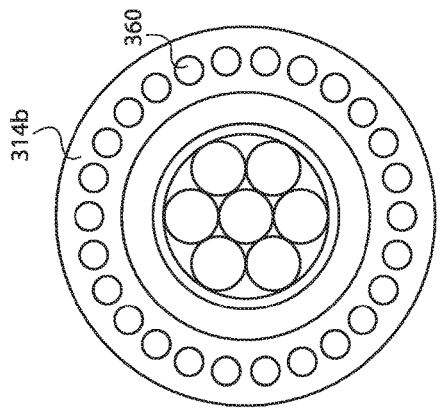
Figure 16F:
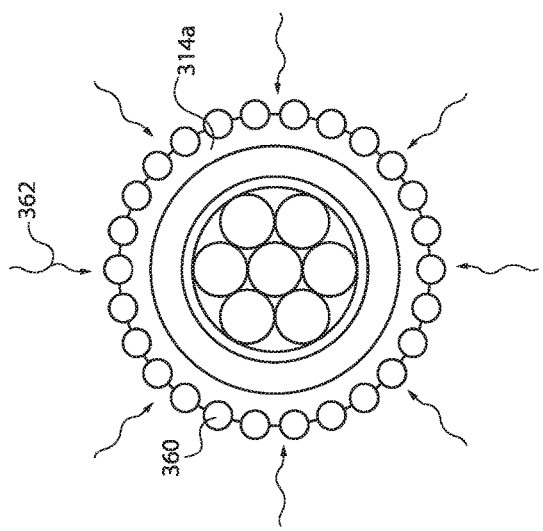
Figure 16E:
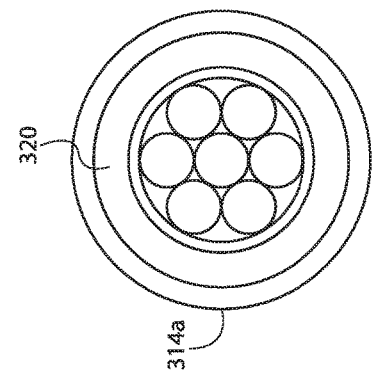
Figure 16I:
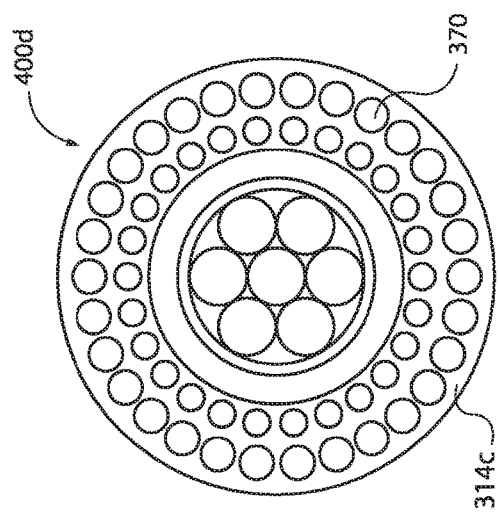
Figure 16H:
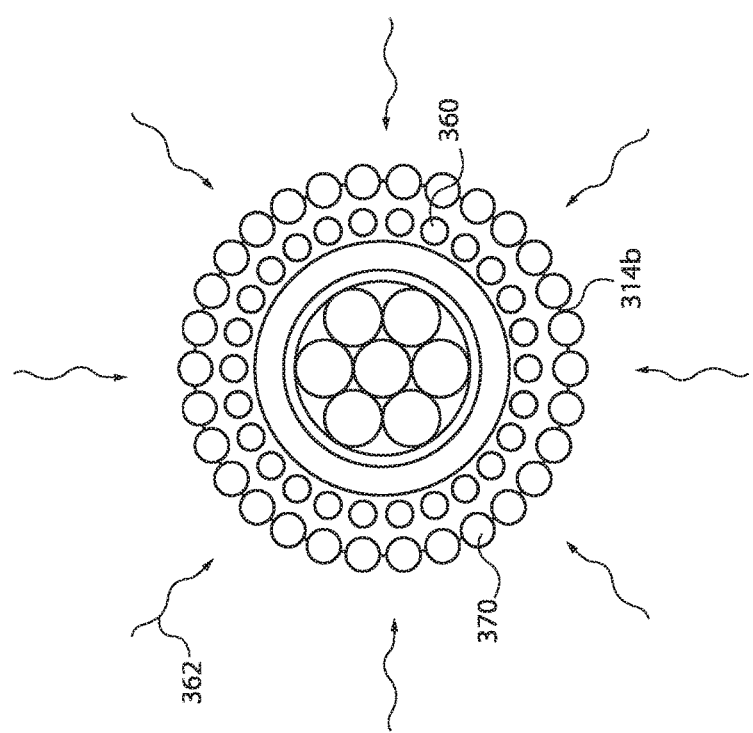

FIGS. 16A-16I depict manufacture of jacketed multi-component 400d in accordance with this disclosure. Multi-component cable 300 is provided, as shown in FIG. 16A. Corrugated metallic tape 320 having sides 319 is provided, as shown in FIG. 16B. Corrugated metallic tape 320 may be wrapped longitudinally and circumferentially about deformable polymer 304, as shown in FIGS. 16C and 16D. Sides 319 of corrugated metallic tape 320 (shown in FIG. 16B) may be overlapped with one another, providing complete or substantially complete coverage over multi-component cable 300. In certain embodiments, layer of corrugated metallic tape 320 is at least partially embedded into deformable polymer 304. In certain embodiments, layer of corrugated metallic tape 320 is wrapped about two layers of deformable polymer 304. Layer of corrugated metallic tape 320 may form a tube about multi-component cable 300. First layer of reinforced polymer 314a may longitudinally and circumferentially surround layer of corrugated metallic tape 320, as shown in FIG. 16E. For example and without limitation, first layer of reinforced polymer 314a may be extruded over layer of corrugated metallic tape 320, encasing layer of corrugated metallic tape 320. First layer of reinforced polymer 314a may form a circular-profile, aiding in subsequent manufacturing steps. Inner layer of armor wires 360 may longitudinally and circumferentially surround reinforced polymer 314a, as shown in FIG. 16F. In certain embodiments, inner layer of armor wires 360 may be at least partially embedded into reinforced polymer 314a. For example and without limitation, inner layer of armor wires 360 may be applied to reinforced polymer 314a while reinforced polymer 314a is in a pliable state, such as after extrusion of reinforced polymer 314a or after passing multi-component cable 300 with reinforced polymer 314a through an infrared 362 heating source. Second layer of reinforced polymer 314b may surround inner layer of armor wires 360, as shown in FIG. 16G. For example and without limitation, second layer of reinforced polymer 314b may be extruded over inner layer of armor wires 360, encasing inner layer of armor wires 360. Reinforced polymer 314b may bond with reinforced polymer 314a through the interstitial spaces between the wires of inner layer of armor wires 360. Reinforced polymer 314b may longitudinally and circumferentially surround inner layer of armor wires 360. Outer layer of armor wires 370 may be partially embedded into reinforced polymer 314b, as shown in FIG. 16H. Outer layer of armor wires 370 may longitudinally and circumferentially surround reinforced polymer 314b. For example and without limitation, while reinforced polymer 314b is in a pliable state, outer layer of armor wires 370 may be partially embedded into reinforced polymer 314b. Reinforced polymer 314b may be in a pliable state after extrusion of second layer of reinforced polymer 314b or after passing multi-component cable 300 with reinforced polymer 314b through infrared 362 heating source, for example. Third layer of reinforced polymer 314c may longitudinally and circumferentially surround outer layer of armor wires 370, as shown in FIG. 16I. Reinforced polymer 314c may bond with reinforced polymer 314b through interstitial spaces between the armor wires of outer layer of armor wires 370, encasing outer layer of armor wires 370.

Figure 17A:
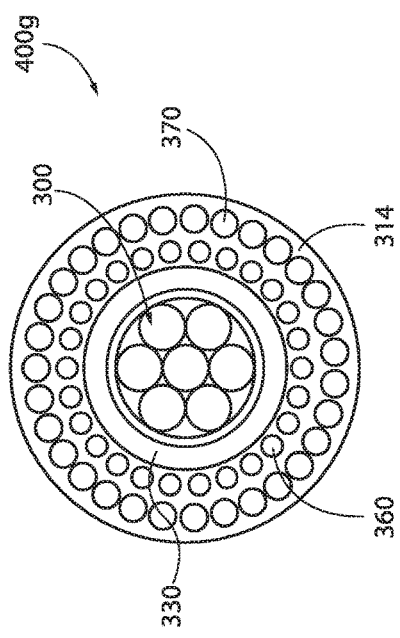
FIGS. 17A-17C depicts cross-sectional views of jacketed multi-component cables having a layer of metallic cladding tape in accordance with certain embodiments of the present disclosure.
Figure 17C:
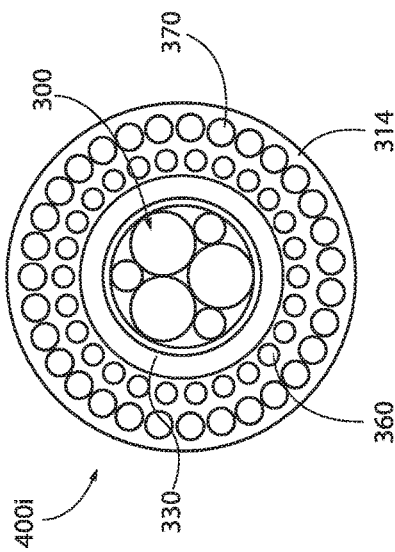
Figure 17B:
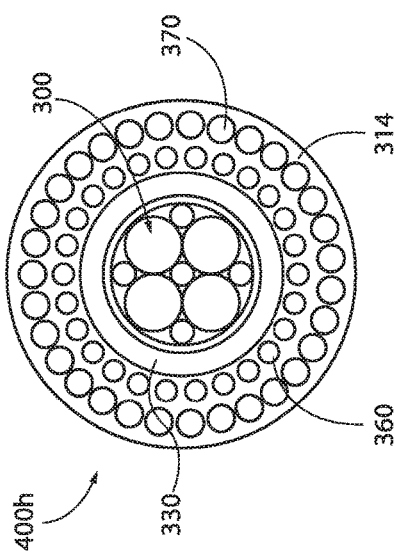

FIGS. 17A-17C depict additional embodiments of jacketed multi-component cables in accordance with this disclosure. FIG. 17A depicts jacketed multi-component cable 400g having a hepta configuration. FIG. 17B depicts jacketed multi-component cable 400h having a quad configuration. FIG. 17C depicts jacketed multi-component cable 400i having a triad configuration. With reference to FIGS. 17A-17C, each jacketed multi-component cable 400g-400i may include a layer of metallic cladding tape 330 longitudinally and circumferentially surrounding multi-component cable 300. Metallic cladding tape 330 may form a tube (e.g., corrugated tube) longitudinally and circumferentially about multi-component cable 300, which may be compression-resistant and adapted to bend over radii, such as spools and sheaves. Each jacketed multi-component cable 400g-400i may include one or more layers of reinforced polymer 314 longitudinally and circumferentially surrounding metallic cladding tape 330. In operation, under compressive forces during deployment of multi-component cable 300, metallic cladding tape 330 may form a compression-resistant tube, distributing the compressive forces circumferentially about multi-component cable 300, preventing or reducing the occurrence of milking. Each of jacketed multi-component cables 400g-400i may include one or more layers of armor wires. For example, each of jacketed multi-component cables 400g-400i may include inner layer of armor wires 360 and outer layer of armor wires 370. In certain embodiments, inner layer of armor wires 360 may be cabled helically over multi-component cable 300. In some embodiments, outer layer of armor wires 370 may be cabled counter-helically to inner layer of armor wires 360.

Figure 18H:
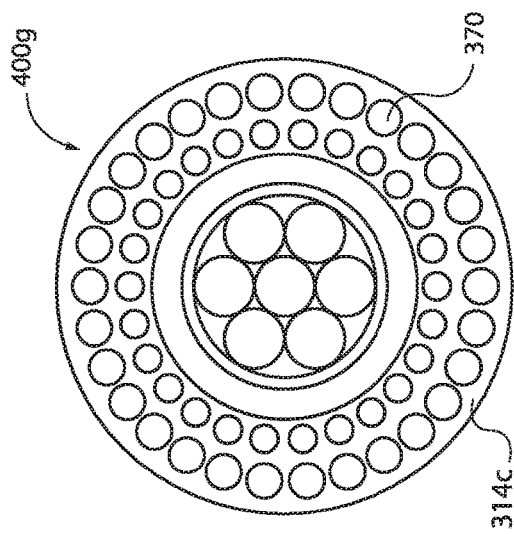
Figure 18G:
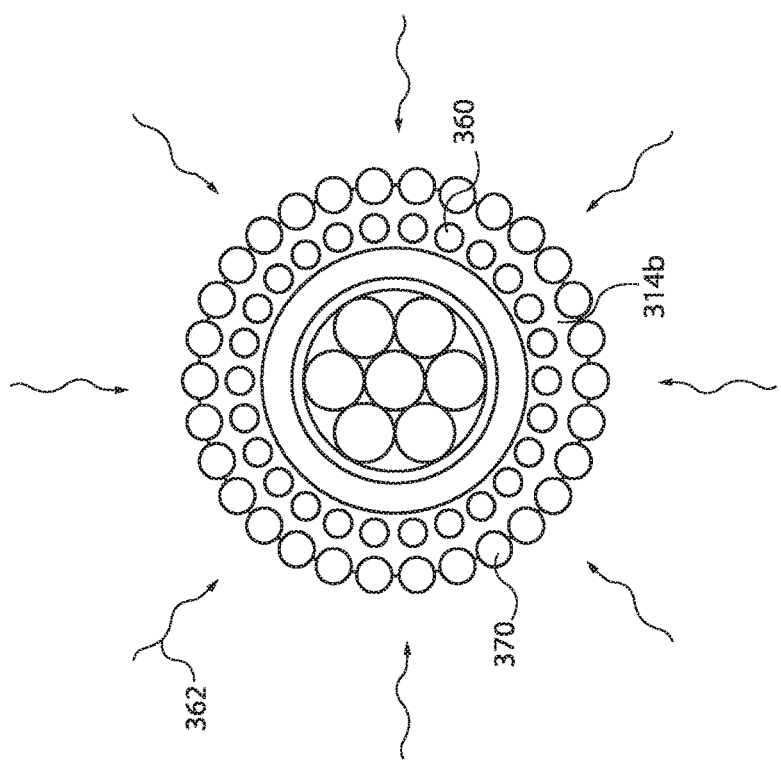

FIGS. 18A-18H depict manufacture of jacketed multi-component cables 400g in accordance with this disclosure. Multi-component cable 300 may be provided, as shown in FIG. 18A. Metallic cladding tape 330 may be wrapped about multi-component cable 300 to longitudinally and circumferentially surround deformable polymer 304, as shown in FIGS. 18B and 18C. In certain embodiments, metallic cladding tape 330 may be wrapped helically over deformable polymer 304. Deformable polymer 304 may encase metallic cladding tape 330 and retain metallic cladding tape 330 in place during manufacturing and/or during deployment (e.g., in a wellbore) of multi-component cable 300. Sides 332 of metallic cladding tape 330 may be overlapped, providing complete or substantially complement coverage of multi-component cable 300. First layer of reinforced polymer 314a may longitudinally and circumferentially surround metallic cladding tape 330, as shown in FIG. 18D. For example and without limitation, first layer of reinforced polymer 314a may be extruded over metallic cladding tape 330, encasing metallic cladding tape 330. Reinforced polymer 314a may retain metallic cladding tape 330 in place about multi-component cable 300, such as during manufacturing and/or deployment (e.g., in a wellbore). Inner layer of armor wires 360 may longitudinally and circumferentially surround reinforced polymer 314a, as shown in FIG. 18E. In certain embodiments, inner layer of armor wires 360 may be at least partially embedded into reinforced polymer 314a. For example and without limitation, inner layer of armor wires 360 may be applied to reinforced polymer 314a while reinforced polymer 314a is in a pliable state, such as after extrusion of reinforced polymer 314a or after passing multi-component cable 300 with reinforced polymer 314a through an infrared 362 heating source. Second layer of reinforced polymer 314b may surround inner layer of armor wires 360, as shown in FIG. 18F. For example and without limitation, second layer of reinforced polymer 314b may be extruded over inner layer of armor wires 360, encasing inner layer of armor wires 360. Reinforced polymer 314b may bond with reinforced polymer 314a through the interstitial spaces between the wires of inner layer of armor wires 360. Reinforced polymer 314b may longitudinally and circumferentially surround inner layer of armor wires 360. Outer layer of armor wires 370 may be partially embedded into reinforced polymer 314b, as shown in FIG. 18G. Outer layer of armor wires 370 may longitudinally and circumferentially surround reinforced polymer 314b. For example and without limitation, while reinforced polymer 314b is in a pliable state, outer layer of armor wires 370 may be partially embedded into reinforced polymer 314b. Reinforced polymer 314b may be in a pliable state after extrusion of second layer of reinforced polymer 314b or after passing multi-component cable 300 with reinforced polymer 314b through infrared 362 heating source, for example. Third layer of reinforced polymer 314c may longitudinally and circumferentially surround outer layer of armor wires 370, as shown in FIG. 18H. Reinforced polymer 314c may bond with reinforced polymer 314b through interstitial spaces between the armor wires of outer layer of armor wires 370, encasing outer layer of armor wires 370.

Figure 19A:
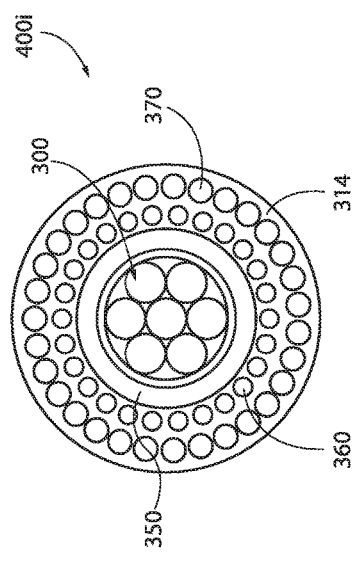
FIGS. 19A-19C depicts cross-sectional views of jacketed multi-component cables having a layer of hard polymer in accordance with certain embodiments of the present disclosure.
Figure 19C:
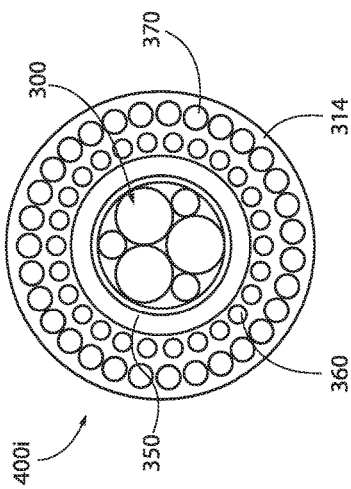
Figure 19B:
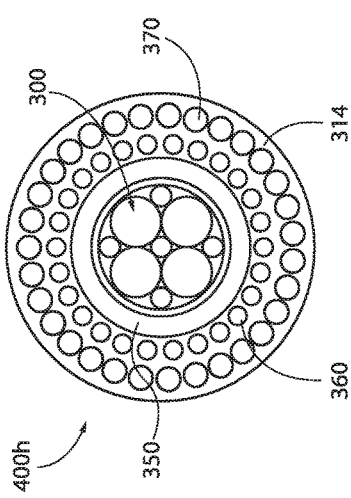

FIGS. 19A-19C depict additional embodiments of jacketed multi-component cables in accordance with this disclosure. FIG. 19A depicts jacketed multi-component cable 400j having a hepta configuration. FIG. 19B depicts jacketed multi-component cable 400k having a quad configuration. FIG. 19C depicts jacketed multi-component cable 400l having a triad configuration. Each jacketed multi-component cable 400j-400l may include hard polymeric layer 350 longitudinally and circumferentially surrounding multi-component cable 300. In certain embodiments, hard polymeric layer 350 may be composed of polyetheretherketone (PEEK) or another hard polymer. In operation, hard polymer layer 350 may encase multi-component cable 300 and protect multi-component cable 300 against compressive forces during the manufacturing process and deployment operations. Each jacketed multi-component cable 400j-400l may include one or more layers of reinforced polymer 314 longitudinally and circumferentially surrounding hard polymeric layer 350. Each of jacketed multi-component cables 400j-400l may include one or more layers of armor wires. For example, each of jacketed multi-component cables 400j-400l may include inner layer of armor wires 360 and outer layer of armor wires 370. In certain embodiments, inner layer of armor wires 360 may be cabled helically over multi-component cable 300. In some embodiments, outer layer of armor wires 370 may be cabled counter-helically to inner layer of armor wires 360.

Figure 20G:
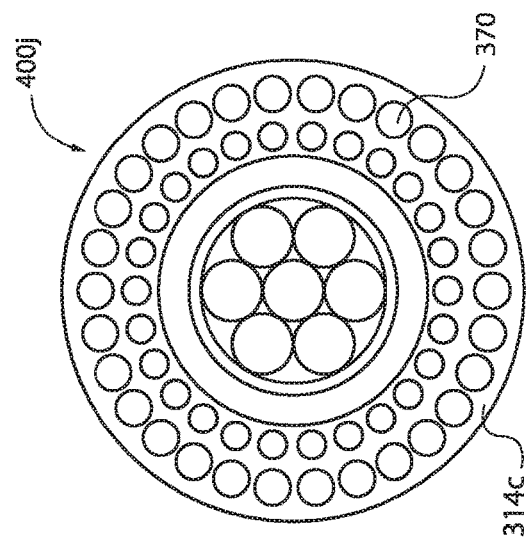
Figure 20F:
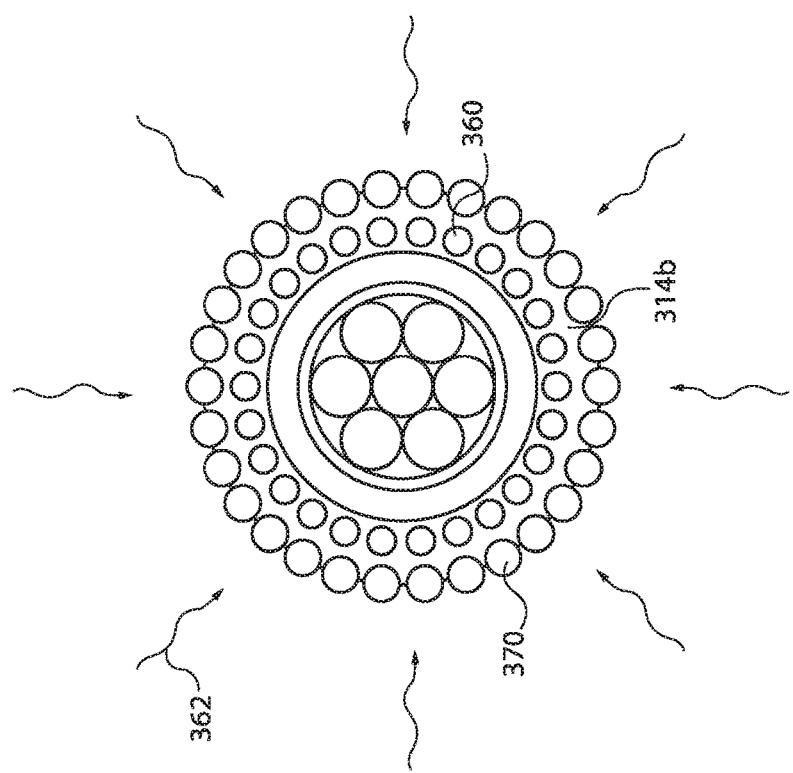

FIGS. 20A-20G depict manufacture of jacketed multi-component cables 400j in accordance with this disclosure. Multi-component cable 300 may be provided, as shown in FIG. 20A. Hard polymeric layer 350 may be extruded over deformable polymer 304, encasing deformable polymer 304. First layer of reinforced polymer 314a may be extruded over hard polymeric layer 350, encasing hard polymeric layer 350. Inner layer of armor wires 360 may longitudinally and circumferentially surround reinforced polymer 314a, as shown in FIG. 20D. In certain embodiments, inner layer of armor wires 360 may be at least partially embedded into reinforced polymer 314a. For example and without limitation, inner layer of armor wires 360 may be applied to reinforced polymer 314a while reinforced polymer 314a is in a pliable state, such as after extrusion of reinforced polymer 314a or after passing multi-component cable 300 with reinforced polymer 314a through an infrared 362 heating source. Second layer of reinforced polymer 314b may surround inner layer of armor wires 360, as shown in FIG. 20E. For example and without limitation, second layer of reinforced polymer 314b may be extruded over inner layer of armor wires 360, encasing inner layer of armor wires 360. Reinforced polymer 314b may bond with reinforced polymer 314a through the interstitial spaces between the wires of inner layer of armor wires 360. Reinforced polymer 314b may longitudinally and circumferentially surround inner layer of armor wires 360. Outer layer of armor wires 370 may be partially embedded into reinforced polymer 314b, as shown in FIG. 20F. Outer layer of armor wires 370 may longitudinally and circumferentially surround reinforced polymer 314b. For example and without limitation, while reinforced polymer 314b is in a pliable state, outer layer of armor wires 370 may be partially embedded into reinforced polymer 314b. Reinforced polymer 314b may be in a pliable state after extrusion of second layer of reinforced polymer 314b or after passing multi-component cable 300 with reinforced polymer 314b through infrared 362 heating source, for example. Third layer of reinforced polymer 314c may longitudinally and circumferentially surround outer layer of armor wires 370, as shown in FIG. 20G. Reinforced polymer 314c may bond with reinforced polymer 314b through interstitial spaces between the armor wires of outer layer of armor wires 370, encasing outer layer of armor wires 370.

In operation, multi-component cable 300 or jacketed multi-component cables 400a-400j may provide one or more low voltage paths via electrical conductor cables 302 and/or wires (e.g., 104, 104a-104e), one or more telemetry paths via fiber optic cables 110 and/or wires (e.g., 104, 104a-104e), one or more high voltage electrical paths via electrical conductor cables 302 and/or wires (e.g., 104, 104a-104e), or combinations thereof. In certain embodiments, such as the quad configuration, multi-component cable 300 or jacketed multi-component cables 400a-400j may supply AC power to downhole tools.

In certain embodiments, multi-component cable 300 or jacketed cables 400a-400j may be used with wellbore devices to perform operations in wellbores penetrating geologic formations that may contain gas and oil reservoirs. Multi-component cable 300 or jacketed multi-component cables 400a-400j may be used to interconnect well logging tools, such as gamma-ray emitters/receivers, caliper devices, resistivity-measuring devices, seismic devices, neutron emitters/receivers, downhole tractors, mechanical service tools, and the like, to one or more power supplies and data logging equipment outside the well. Multi-component cable 300 or jacketed multi-component cables 400a-400j may be used in seismic operations, including subsea and subterranean seismic operations. Multi-component cable 300 or jacketed multi-component cables 400a-400j may be used as permanent monitoring cables for wellbores.

EXAMPLES

The disclosure having been generally described, the following examples show particular embodiments of the disclosure. It is understood that the example is given by way of illustration and is not intended to limit the specification or the claims.

Example 1—Manufacturing Process—Channel and Cap Configuration

The manufacture of an opto-electrical cable having a channel and cap configuration may proceed as follows:
1. A first conductive metal wire having a partial-circular-profile is provided. One side of the first conducted metal wire is planar, with a channel running longitudinally along the planar side.
2. One or more optical fibers are placed into the channel.
3. Soft gel filler is placed into the channel, encasing the one or more optical fibers and serving as a protective cushion.
4. A second conductive metal wire is provided. The second conductive metal wire has a semicircular outer profile and a tab sized to fit within the channel in the first conductive metal wire.
5. The second conductive metal wire is fitted into the first conductive metal wire to form an opto-electrical cable core.
6. A layer of tape (e.g., PEEK) is applied over the opto-electrical cable core to form an opto-electrical cable. Alternatively, a layer of polymer is extruded over the opto-electrical cable core to form the opto-electrical cable.

Example 2—Manufacturing Process—Circular Wire with Multiple Channels

The manufacture of an opto-electrical cable having a wire with multiple channels may proceed as follows:
1. A conductive metal wire having a circular-profile with three or more uniformly spaced channels around the outer diameter of the conductive metal wire is provided.
2. One or more optical fibers are placed in each channel.
3. Soft gel filler is placed into each channel, encasing the optical fibers and serving as a protective cushion to form an opto-electrical cable core.
4. A layer of tape (e.g., PEEK) or polymer extrusion is applied over the opto-electrical cable core to form an opto-electrical cable.

Example 3—Manufacturing Process—Circular Wire with a Single Channel

The manufacture of an opto-electrical cable having a wire with a single channel may proceed as follows:
1. A conductive metal wire having a circular-profile with a single channel located in the outer diameter of the conductive metal wire is provided.
2. One or more optical fibers are placed in the channel.
3. Soft gel filler is placed into the channel, encasing the optical fibers and serving as a protective cushion to form an opto-electrical cable core.
4. A layer of tape (e.g., PEEK) or polymer extrusion is applied over the opto-electrical cable core to form an opto-electrical cable.

Example 4—Manufacturing Process—Hexagonal Wire with a Flat Base and Single Channel The manufacture of an opto-electrical cable having a hexagonal wire with a single channel may proceed as follows:
1. A conductive metal wire having an approximately hexagonal-profile with a single channel located in the outer diameter of the conductive metal wire, a planar base opposite the single channel, and at least partially flattened sides is provided.
2. The conductive metal wire is held in place upon the planar base, optionally by holding the at least partially flattened sides.
3. One or more optical fibers are placed in the channel.
4. Soft gel filler is placed into the channel, encasing the optical fibers and serving as a protective cushion to form an opto-electrical cable core.
5. A layer of tape (e.g., PEEK) or polymer extrusion is applied over the opto-electrical cable core to form an opto-electrical cable and provide the opto-electrical cable with a circular-profile.

Example 5—Manufacturing Process—C-Shaped Wire with a Single Channel

The manufacture of an opto-electrical cable having a C-shaped wire with a single channel may proceed as follows:
1. A conductive metal wire having a C-shaped-profile and an interior that forms a channel running the length of the conductive metal wire is provided.
2. One or more optical fibers are placed in the channel.
3. Soft gel filler is placed into the channel, encasing the optical fibers and serving as a protective cushion.
4. A plug is placed into an opening of the channel to seal the soft gel filler within the channel and form an opto-electrical cable core. A gel or other material that forms the plug may form a thin layer over the outer surface of the conductive metal wire.
5. A layer of tape (e.g., PEEK) or polymer extrusion is applied over the opto-electrical cable core to form an opto-electrical cable.

Example 6—Manufacturing Process—Core Completion

Completion of any of the opto-electrical cables of Examples 1-5 to form a completed opto-electrical cable may proceed as follows:
1. A layer of cladding is applied over an opto-electrical cable formed in accordance with any of Examples 1-5; or
2. A jacket layer is applied over an opto-electrical cable formed in accordance with any of Examples 1-5. The jacket layer may include small served wires encased in a polymer layer (e.g., TEFZEL® or Carbon-fiber-reinforced TEFZEL1®); or
3. Two semi-circular-shaped metallic wires (e.g., arcuate metal wires) are placed over an opto-electrical cable formed in accordance with any of Examples 1-5, forming an outer tube, followed by application of an additional layer of polymer over the tube; or
4. A layer of metallic tape with a longitudinal crimped seam is applied over an opto-electrical cable formed in accordance with any of Examples 1-5, followed by application of an additional layer of polymer over the layer of metallic tape.

Example 7—Manufacturing Process—Coaxial Core Completion

Completion of any of the opto-electrical cables of Examples 1-5 to form a completed opto-electrical cable may proceed as follows:

1. An opto-electrical cable formed in accordance with any of Examples 1-5 is provided.
2. A layer of soft silicone polymer is extruded over the opto-electrical cable. A powder may be placed over the silicone to alleviate the possibility of the silicone sticking to the metal in subsequent step 3.
3. A number of arch-profile wires are placed over the layer of soft silicone polymer. As the wires compress over the layer of soft silicone polymer, the soft silicone polymer fills the interstitial spaces between the arch-profile wires.
4. A layer of stranded wires encased in layers of polymer is applied over the arch-profile wires to form a completed opto-electrical cable having a coaxial cable configuration.

Example 8—Manufacturing Process—Arch-Profile Wire Jacketing

A completed opto-electrical cable formed in accordance with either Example 6 or 7 may be arranged into a jacketed multi-component cable as follows:
1. A layer of soft, deformable polymer is applied over one or more completed opto-electrical cables formed in accordance with Example 6 and/or 7, and one or more electrical conductor cables, forming a multi-component cable. The completed opto-electrical cables and electrical conductor cables may have a triad, quad, or hepta configuration, for example.
2. A number of arch-profile metallic wires sufficient to cover the circumference of the multi-component cable are placed longitudinally over the multi-component cable.
3. The arch-profile wires are embedded into the soft, deformable polymer. The arch-profile wires are shaped to allow the polymer to deform into interstitial spaces between the arch-profile wires. The outer profiles of the arch-profile wires contact each other and form a compression-resistant barrier over the multi-component cable.
4. A first layer of carbon-fiber-reinforced (CFR) polymer is extruded over the arch-profile wires to lock the arch-profile wires in place about the multi-component cable.
5. While the first layer of CFR polymer is still pliable or after passing the multi-component cable through an infrared heating source, an inner layer of armor wire strength members is cabled helically over and partially embedded into the first layer of CFR-polymer.
6. A second layer of CFR polymer is extruded over the inner layer of armor wire strength members and bonds with the first layer of CFR polymer layer through the interstitial spaces between the armor wire strength members.
7. While the second layer of CFR polymer is still pliable or after passing the multi-component cable through an infrared heating source, an outer layer of armor wire strength members is cabled counter-helically to the inner layer of armor wire strength members over and is partially embedded into the second layer of CFR-polymer.
8. For additional seal, a final layer of CFR polymer is extruded over the outer layer of armor wire strength members and bonds with the second layer of CFR polymer layer through the interstitial spaces between the armor wire strength members, forming the jacketed multi-component cable.

Example 9—Manufacturing Process—Corrugated Metallic Tape Jacketing

A completed opto-electrical cable formed in accordance with either of Example 6 or 7 may be arranged into a jacketed multi-component cable as follows:
1. A layer of soft, deformable polymer is applied over one or more completed opto-electrical cable formed in accordance with Example 6 and/or 7, and one or more electrical conductor cables, forming a multi-component cable. The completed opto-electrical cables and electrical conductor cables may have a triad, quad, or hepta configuration, for example.
2. A corrugated metallic tape is wrapped longitudinally around and embedded into the soft, deformable polymer to form a corrugated tube. The sides of the corrugated metallic tape overlap to ensure complete coverage.
3. A first layer of carbon-fiber-reinforced (CFR) polymer is extruded over the corrugated metallic tape to lock the corrugated metallic tape in place about the multi-component cable.
4. While the first layer of CFR polymer is still pliable or after passing the multi-component cable through an infrared heating source, an inner layer of armor wire strength members is cabled helically over and partially embedded into the first layer of CFR-polymer.
5. A second layer of CFR polymer is extruded over the inner layer of armor wire strength members and bonds with the first layer of CFR polymer layer through the interstitial spaces between the armor wire strength members.
6. While the second layer of CFR polymer is still pliable or after passing the multi-component cable through an infrared heating source, an outer layer of armor wire strength members is cabled counter-helically to the inner layer of armor wire strength members over and is partially embedded into the second layer of CFR-polymer.
7. For additional seal, a final layer of CFR polymer is extruded over the outer layer of armor wire strength members and bonds with the second layer of CFR polymer layer through the interstitial spaces between the armor wire strength members, forming the jacketed multi-component cable.

Example 10—Manufacturing Process—Metallic Cladding Tape Jacketing

A completed opto-electrical cable formed in accordance with either of Example 6 or 7 may be arranged into a jacketed multi-component cable as follows:
1. A layer of soft, deformable polymer is applied over one or more completed opto-electrical cables formed in accordance with Example 6 and/or 7, and one or more electrical conductor cables, forming a multi-component cable. The completed opto-electrical cables and the electrical conductor cables may have a triad, quad, or hepta configuration, for example.
2. A layer of metallic cladding tape is helically wrapped over the soft, deformable polymer. The sides of the metallic cladding tape overlap to ensure complete coverage of the multi-component cable.
3. A first layer of carbon-fiber-reinforced (CFR) polymer is extruded over the metallic cladding tape to lock the metallic cladding tape in place about the multi-component cable.
4. While the first layer of CFR polymer is still pliable or after passing the multi-component cable through an infrared heating source, an inner layer of armor wire strength members is cabled helically over and partially embedded into the first layer of CFR-polymer.
5. A second layer of CFR polymer is extruded over the inner layer of armor wire strength members and bonds with the first layer of CFR polymer layer through the interstitial spaces between the armor wire strength members.
6. While the second layer of CFR polymer is still pliable or after passing the multi-component cable through an infrared heating source, an outer layer of armor wire strength members is cabled counter-helically to the inner layer of armor wire strength members over and is partially embedded into the second layer of CFR-polymer.
7. In some embodiments, for additional seal, a final layer of CFR polymer is extruded over the outer layer of armor wire strength members and bonds with the second layer of CFR polymer layer through the interstitial spaces between the armor wire strength members, forming the jacketed multi-component cable.

Example 11—Manufacturing Process—PEEK Jacketing

A completed opto-electrical cable formed in accordance with either of Example 6 or 7 may be arranged into a jacketed multi-component cable as follows:
1. A layer of soft, deformable polymer or tape is applied over one or more completed opto-electrical cables formed in accordance with Example 6 and/or 7, and one or more electrical conductor cables, forming a multi-component cable. The completed opto-electrical cables and the electrical conductor cables may have a triad, quad, or hepta configuration, for example.
2. A thick layer of polyetheretherketone (PEEK) or other hard polymer is extruded over the soft, deformable polymer or tape.
3. A first layer of carbon-fiber-reinforced (CFR) polymer is extruded over the thick layer of polyetheretherketone (PEEK) or other hard polymer.
4. While the first layer of CFR polymer is still pliable or after passing the multi-component cable through an infrared heating source, an inner layer of armor wire strength members is cabled helically over and partially embedded into the first layer of CFR-polymer.
5. A second layer of CFR polymer is extruded over the inner layer of armor wire strength members and bonds with the first layer of CFR polymer layer through the interstitial spaces between the armor wire strength members.
6. While the second layer of CFR polymer is still pliable or after passing the multi-component cable through an infrared heating source, an outer layer of armor wire strength members is cabled counter-helically to the inner layer of armor wire strength members over and is partially embedded into the second layer of CFR-polymer.
7. In some embodiments, for additional seal, a final layer of CFR polymer is extruded over the outer layer of armor wire strength members and bonds with the second layer of CFR polymer layer through the interstitial spaces between the armor wire strength members, forming the jacketed multi-component cable.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. An opto-electrical cable comprising:
   an opto-electrical cable core comprising a wire, one or more channels formed within the wire and extending along a longitudinal axis of the wire, and one or more optical fibers extending longitudinally within each channel, wherein the wire comprises a base wire and a cap wire, wherein one channel is formed within the base wire between two portions of a base wire mating face of the base wire and extends along the longitudinal axis the base wire, and wherein the cap wire comprises a tab mechanically coupled within the one channel of the base wire, enclosing the one channel; and
   a polymer layer longitudinally and circumferentially surrounding the opto-electrical cable core.

2. The opto-electrical cable of claim 1, wherein the wire comprises one or more channels formed within the wire about an outer circumference of the wire, and wherein each channel is formed between two portions of the outer wire circumference.

3. The opto-electrical cable of claim 2, wherein the wire comprises a base formed along the outer wire circumference and extending longitudinally along the wire, and one channel formed between two portions of the outer wire circumference and extending along the longitudinal axis of the wire opposite the base.

4. The opto-electrical cable of claim 1, wherein the wire has a C-shaped profile.

5. The opto-electrical cable of claim 1, further comprising one or more completion layers, wherein the one or more completion layers comprise:
   a layer of cladding longitudinally and circumferentially surrounding the polymer layer; or
   a jacket layer longitudinally and circumferentially surrounding the polymer layer, wherein the jacket layer comprises wires encased within a polymer; or
   a tube longitudinally and circumferentially surrounding the polymer layer, wherein the tube comprises two arcuate metal wires, and a second polymer layer surrounding the tube; or
   a metallic tape longitudinally and circumferentially surrounding the polymer layer, wherein the metallic tape comprises a longitudinally crimped seam, and an additional layer of polymer longitudinally and circumferentially surrounding the metallic tape; or
   a soft polymer layer longitudinally and circumferentially surrounding the polymer layer, a plurality of arch-profile wires longitudinally and circumferentially surrounding the soft polymer layer, wherein a portion of the soft polymer layer fills interstitial spaces between the arch-profile wires, and a layer of stranded wires encased within one or more additional layers of polymer longitudinally and circumferentially surrounding the plurality of arch-profile wires.

6. A multi-component cable comprising:
   one or more electrical conductor cables;
   one or more opto-electrical cables, wherein each opto-electrical cable comprises an opto-electrical cable core comprising a wire, one or more channels formed within the wire and extending along a longitudinal axis of the wire, and one or more optical fibers extending longitudinally within each channel, and a polymer layer longitudinally and circumferentially surrounding each opto-electrical cable core;
   one or more layers of deformable polymer longitudinally and circumferentially surrounding the one or more opto-electrical cables and the one or more electrical conductor cables, wherein the one or more opto-electrical cables and the one or more electrical conductor cables are arranged within the one or more layers of deformable polymer in a coax configuration, a triad configuration, a quad configuration, or a hepta configuration;
   a first jacketing layer longitudinally and circumferentially surrounding the one or more layers of deformable polymer, wherein the first jacketing layer comprises: a plurality of arch-profile wires longitudinally and circumferentially surrounding the one or more layers of deformable polymer, wherein a portion of the one or more layers of deformable polymer fills interstitial spaces between the arch-profile wires; or a layer of corrugated metallic tape longitudinally and circumferentially surrounding the one or more layers of deformable polymer, wherein the layer of corrugated metallic tape is at least partially embedded into the one or more layers of deformable polymer; or a layer of metallic cladding tape longitudinally and circumferentially surrounding the one or more layers of deformable polymer; or a hard polymeric layer longitudinally and circumferentially surrounding the one or more layers of deformable polymer; and
   one or more layers of armor wires encased within one or more layers of reinforced polymer longitudinally and circumferentially surrounding the first jacketing layer.

7. The multi-component cable of claim 6, wherein the one or more opto-electrical cables and the one or more electrical conductor cables are arranged within the one or more layers of deformable polymer in a hepta configuration.

8. An opto-electrical cable comprising:
   an opto-electrical cable core comprising a wire, one or more channels formed within the wire and extending along a longitudinal axis of the wire, and one or more optical fibers extending longitudinally within each channel, wherein the wire comprises one channel formed within a central interior of the wire and extending along the longitudinal axis of the wire, wherein the one channel comprises an opening formed between two portions of an outer wire circumference of the wire, and wherein the opto-electrical cable further comprises: a filler encasing the one or more optical fibers within the one channel; and a plug mechanically coupled with or chemically bonded to the wire at the opening of the one channel, wherein the plug encloses the one channel; and a polymer layer longitudinally and circumferentially surrounding the opto-electrical cable core.

\* \* \* \* \*